United States Patent
Kaneko

(10) Patent No.: US 10,742,850 B2
(45) Date of Patent: Aug. 11, 2020

(54) IMAGE PROCESSING APPARATUS AND CONTROL METHOD THEREOF FOR WHITE BALANCE ADJUSTMENT

(71) Applicant: CANON KABUSHIKI KAISHA, Tokyo (JP)

(72) Inventor: Chiaki Kaneko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 15/950,363

(22) Filed: Apr. 11, 2018

(65) Prior Publication Data

US 2018/0302536 A1     Oct. 18, 2018

(30) Foreign Application Priority Data

Apr. 17, 2017   (JP) ................................ 2017-081436
Jan. 17, 2018   (JP) ................................ 2018-005949

(51) Int. Cl.
  *H04N 1/60*   (2006.01)
  *H04N 9/31*   (2006.01)
  (Continued)

(52) U.S. Cl.
  CPC .......... *H04N 1/6077* (2013.01); *G06T 5/008* (2013.01); *G06T 7/11* (2017.01); *G06T 7/90* (2017.01);
  (Continued)

(58) Field of Classification Search
  CPC .... H04N 1/6077; H04N 1/6086; G06T 5/008; G06T 7/11; G06T 7/90; G06T 9/3182; G06T 9/73
  See application file for complete search history.

(56) References Cited

U.S. PATENT DOCUMENTS

| 5,568,194 A * | 10/1996 | Abe ........................ H04N 9/735 348/223.1 |
| 2004/0090536 A1 * | 5/2004 | Tsai ........................ H04N 9/735 348/223.1 |

(Continued)

FOREIGN PATENT DOCUMENTS

| JP | 2008052428 A | 3/2008 | |
| WO | WO-2014118167 A1 * | 8/2014 | ......... H04N 5/23238 |

OTHER PUBLICATIONS

Landon et al. ("Towards Automatic Photometric Correction of Casually Illuminated Documents," IEEE Conference on Computer Vision and Pattern Recognition, Jun. 17-22, 2007) (Year: 2007).*

(Continued)

*Primary Examiner* — Yubin Hung
(74) *Attorney, Agent, or Firm* — Rossi, Kimms & McDowell LLP

(57) ABSTRACT

In order to provide a more preferable white balance adjustment, an image processing apparatus obtains an input image, determines a representative point in the input image and a white balance coefficient of the representative point, obtains first information representing the inclination of a surface that includes the representative point and second information representing the inclination of a surface that includes a pixel of interest in the input image, and adjusts white balance of the pixel of interest based on the first information, the second information, and the white balance coefficient.

20 Claims, 24 Drawing Sheets

(51) Int. Cl.
*H04N 9/73* (2006.01)
*G06T 7/90* (2017.01)
*G06T 5/00* (2006.01)
*G06T 7/11* (2017.01)

(52) U.S. Cl.
CPC ............ *H04N 9/3182* (2013.01); *H04N 9/73* (2013.01); *H04N 1/6086* (2013.01)

(56) References Cited

U.S. PATENT DOCUMENTS

| | | | | |
|---|---|---|---|---|
| 2007/0136208 | A1* | 6/2007 | Hamashima | B41J 29/026 |
| | | | | 705/62 |
| 2007/0165945 | A1* | 7/2007 | Goma | H04N 1/6077 |
| | | | | 382/167 |
| 2010/0259639 | A1* | 10/2010 | Hung | H04N 9/735 |
| | | | | 348/223.1 |
| 2014/0055481 | A1* | 2/2014 | Gao | G09G 5/02 |
| | | | | 345/589 |
| 2015/0009360 | A1* | 1/2015 | Takasumi | H04N 9/735 |
| | | | | 348/223.1 |
| 2016/0227182 | A1* | 8/2016 | Uekusa | H04N 5/2354 |
| 2016/0350914 | A1* | 12/2016 | Champlin | G06T 7/0012 |
| 2017/0078636 | A1* | 3/2017 | Cho | H04N 1/6027 |
| 2017/0206641 | A1* | 7/2017 | Chang | G06T 5/005 |

OTHER PUBLICATIONS

Sofeikov et al. ("Scene analysis assisting for AWB using binary decision trees and average image metrics," 2014 IEEE International Conference on Consumer Electronics, Jan. 10-13, 2014) (Year: 2014).*

Park et al. ("Efficient and Robust Color Consistency for Community Photo Collections," IEEE Conference on Computer Vision and Pattern Recognition (CVPR), Jun. 27-30, 2016) (Year: 2016).*

Lukac ("Refined automatic white balancing," Electronics Letters, vol. 43, No. 8, Apr. 12, 2007) (Year: 2007).*

Srivastava et al. ("White synthesis with user input for color balancing on mobile camera systems," Proc. SPIE 8304, Feb. 9, 2012) (Year: 2012).*

* cited by examiner

FIG. 4
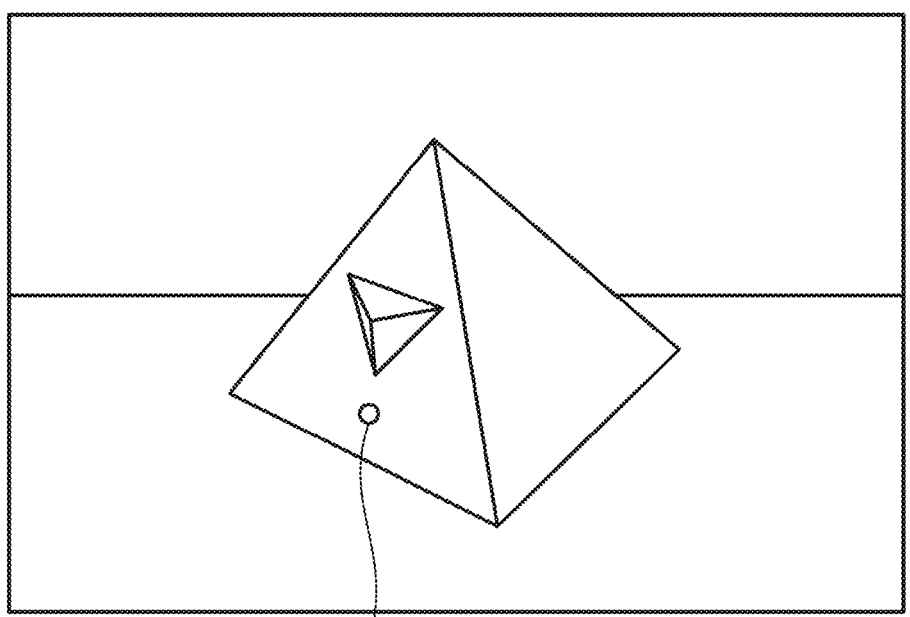
$I(i,j) = (Ir(i,j), Ig(i,j), Ib(i,j))$
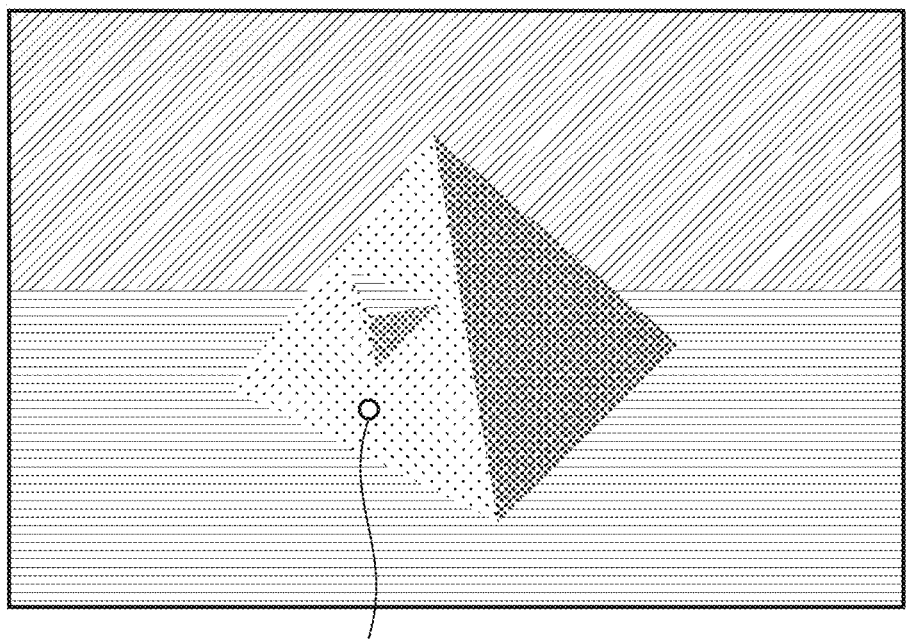
$N(i,j) = (Nx(i,j), Ny(i,j), Nz(i,j))$

FIG. 13
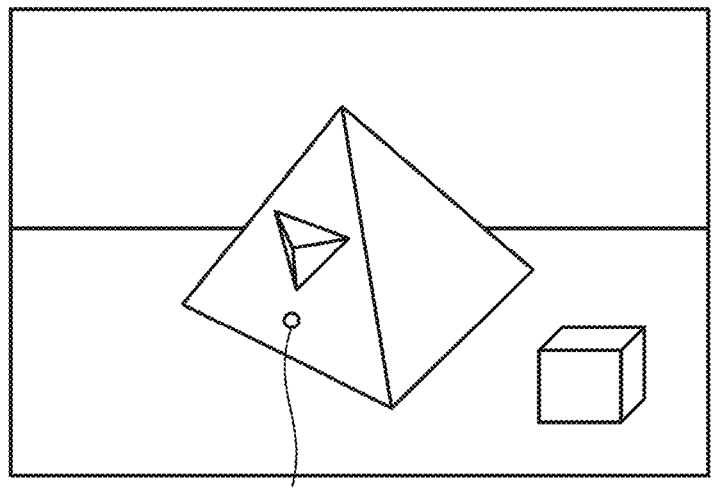
$I(i,j) = (Ir(i,j), Ig(i,j), Ib(i,j))$
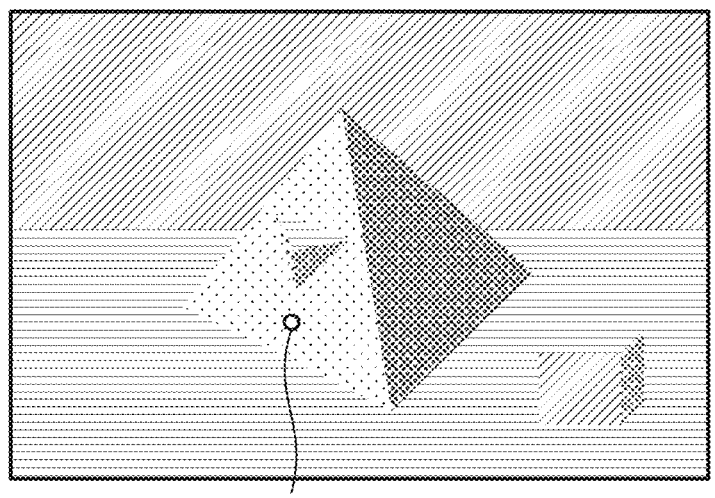
$N(i,j) = (Nx(i,j), Ny(i,j), Nz(i,j))$
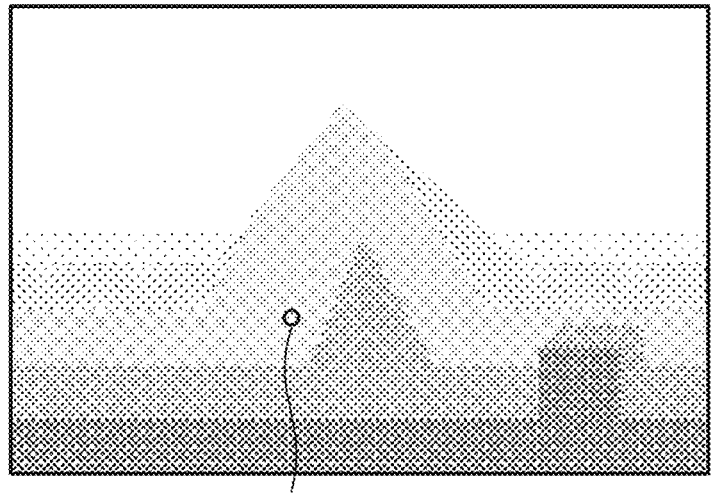
$Z(i,j) = z(i,j)$

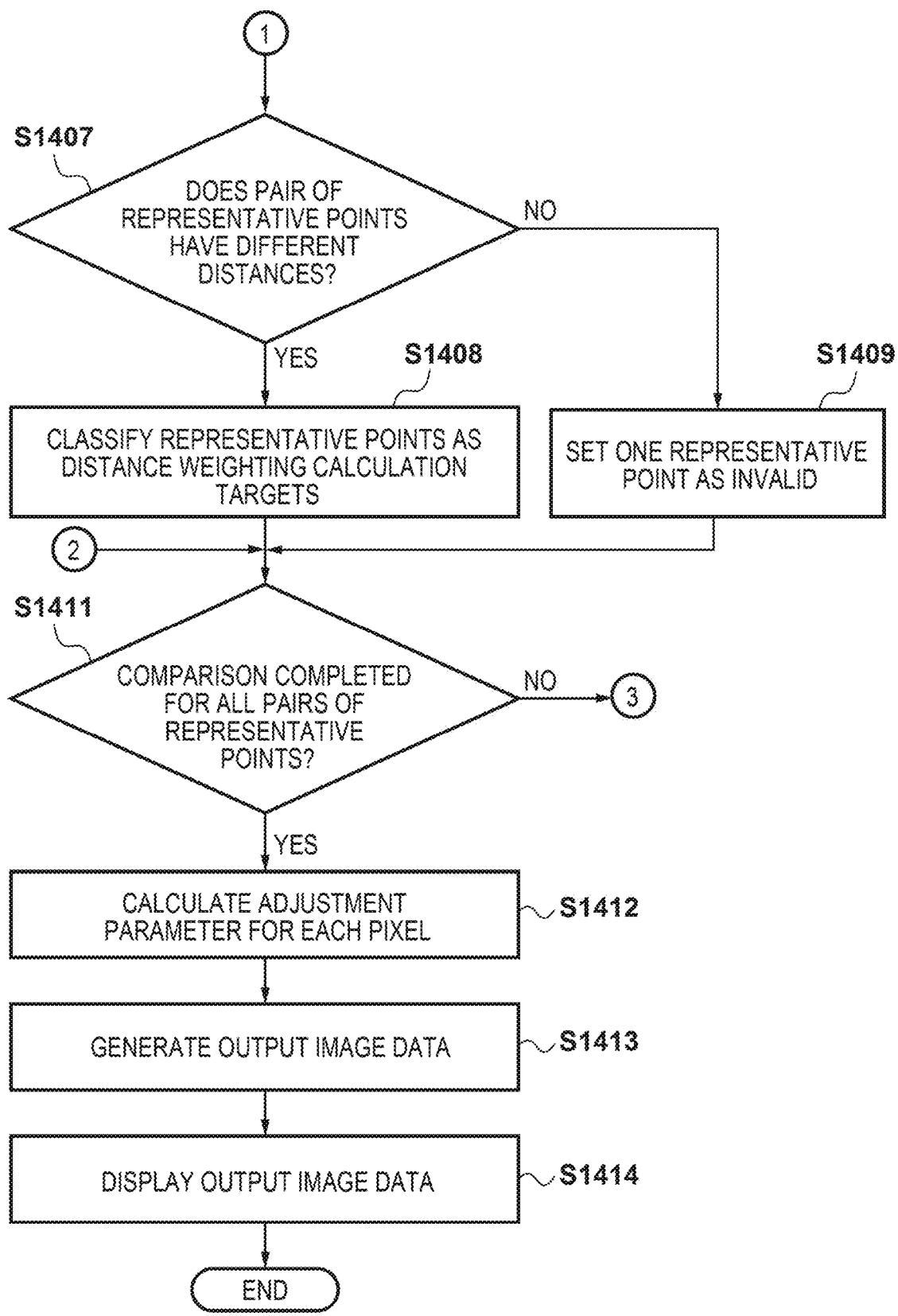

IMAGE PROCESSING APPARATUS AND CONTROL METHOD THEREOF FOR WHITE BALANCE ADJUSTMENT

BACKGROUND OF THE INVENTION

Field of the Invention

The present invention relates to a technique of adjusting the white balance of an image.

Description of the Related Art

As a technique of performing white balance adjustment processing on an image captured under a plurality of light sources with different spectral distributions, Japanese Patent Laid-Open No. 2008-52428 discloses a technique of segmenting a captured image into a plurality of regions and adjusting the white balance for each region. More specifically, there is disclosed a method in which a user manually segments a captured image into regions and designates the color temperature of a light source that illuminates each region. There is also disclosed a method in which the white balance is adjusted for each region by segmenting, based on distance information of a subject with respect to an image capturing apparatus, the captured image into a region reached by the light from an electronic flash and a region not reached by the light from the electronic flash.

However, in the above-described techniques, if region segmentation is to be performed manually, the user needs to segment the image into regions by imagining how the subject is illuminated based on his/her knowledge and experience, thereby requiring time and effort of the user. In addition, if region segmentation is to be performed by using distance information, suitable region segmentation may be difficult in a case in which the direction of emitted light and the emitted light amount of the electronic flash are different from what has been assumed.

SUMMARY OF THE INVENTION

The present invention provides a technique in which a more preferable white balance adjustment is possible.

According to one aspect of the present invention, an image processing apparatus comprises: a first obtainment unit configured to obtain an input image; a determination unit configured to determine a representative point in the input image and a white balance coefficient of the representative point; a second obtainment unit configured to obtain first information representing the inclination of a surface that includes the representative point and second information representing the inclination of a surface that includes a pixel of interest in the input image; and an adjustment unit configured to adjust white balance of the pixel of interest based on the first information, the second information, and the white balance coefficient.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing examples of an input image and normal information;

FIG. 13 is a view showing examples of an input image, normal information, and distance information;

FIGS. 14A and 14B are flowcharts of a series of processes according to the third embodiment;

DESCRIPTION OF THE EMBODIMENTS

Preferred embodiments of the present invention will now be described in detail with reference to the accompanying drawings. Note that the following embodiments are merely examples, and the technical scope of the present invention is not limited by the following embodiments.

First Embodiment

As an image processing apparatus according to the first embodiment of the present invention, a form to determine a white balance adjustment parameter will be exemplified hereinafter. Here, a plurality of representative points each provided with coordinates on a captured image and a white balance adjustment parameter are set, and the white balance adjustment parameter (white balance coefficient) for each pixel is determined by assuming that a surface facing the same normal direction as a representative point is illuminated by common light which also illuminates the representative point. Note that color temperature is used as the adjustment parameter in the description below.

<Apparatus Arrangement>

Figure 1:
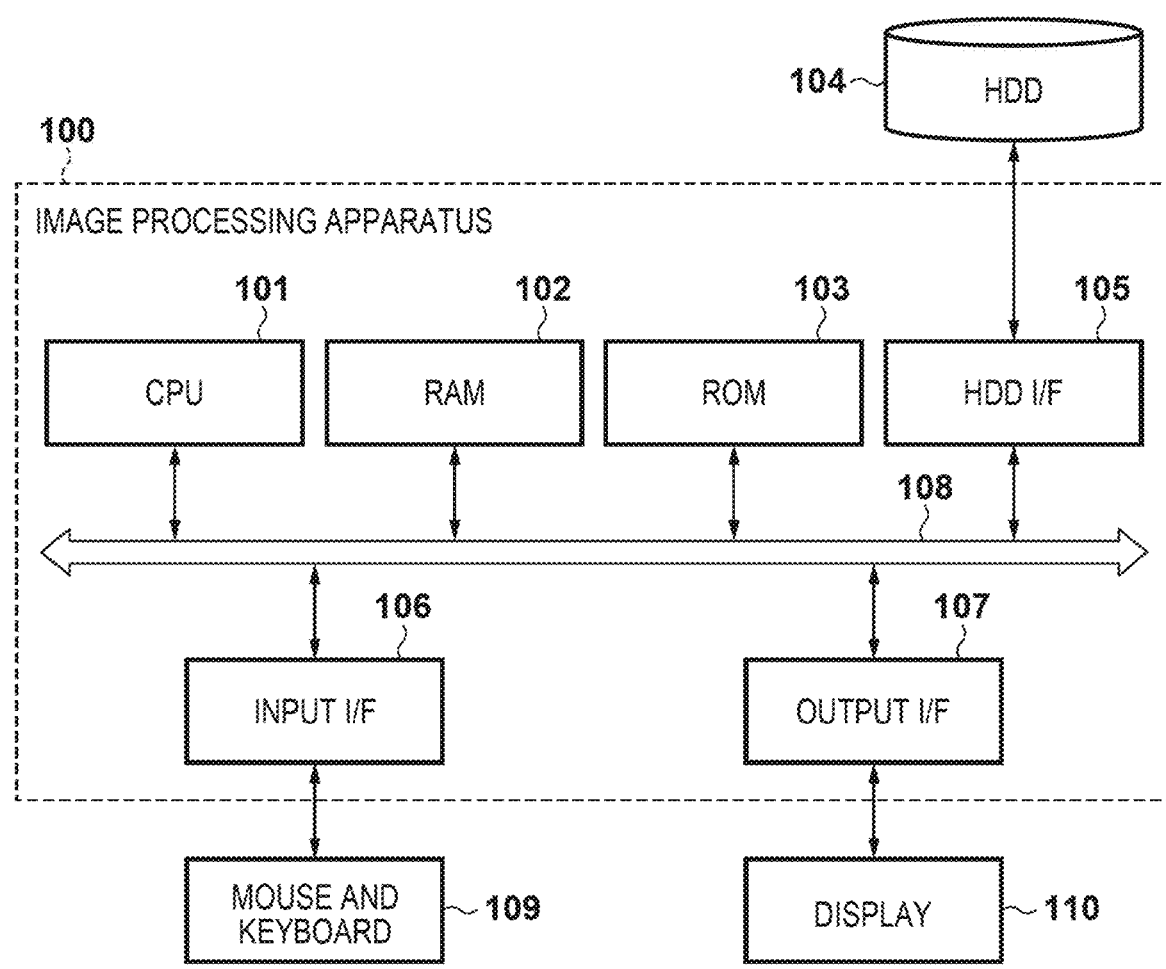
FIG. 1 is a block diagram showing the hardware arrangement of an image processing apparatus according to the first embodiment.

FIG. 1 is a block diagram showing the hardware arrangement of an image processing unit 100 according to the first embodiment. The image processing unit 100 is formed by a CPU 101, a RAM 102, a ROM 103, an HDD 104, an HDD I/F 105, an input I/F 106, an output I/F 107, and a system bus 108.

The CPU 101 executes programs stored in the ROM 103 and the hard disk drive (HDD) 104 by using the RAM 102 as a work memory to control each unit (to be described later) via the system bus 108. The HDD interface (I/F) 105 is an interface, for example, a SATA (serial ATA) or the like, that connects to a secondary storage device such as the HDD 104 and an optical disk drive. The CPU 101 can read out data from the HDD 104 and write data to the HDD 104 via the HDD I/F 105.

In addition, the CPU 101 can load the data stored in the HDD 104 to the RAM 102 and store, in the same manner, data loaded in the RAM 102 to the HDD 104. The CPU 101 can regard the data loaded in the RAM 102 as a program and execute the program. The input I/F 106 is a serial bus interface, for example, a USB or the like, that connects to an input device such as a mouse and keyboard 109. The CPU 101 can read various kinds of signals from the mouse and keyboard 109 via the input I/F 106. The output interface (I/F) 107 is a video output interface, for example, a DVI or the like, that connects to a display device such as a display 110. The CPU 101 can transmit data to the display 110 via the output I/F 107 and cause the display to display the data. Note that the input I/F 106 and the output I/F 107 can be integrated into one interface using a bidirectional communication interface such as USB or IEEE1394.

Figure 2:
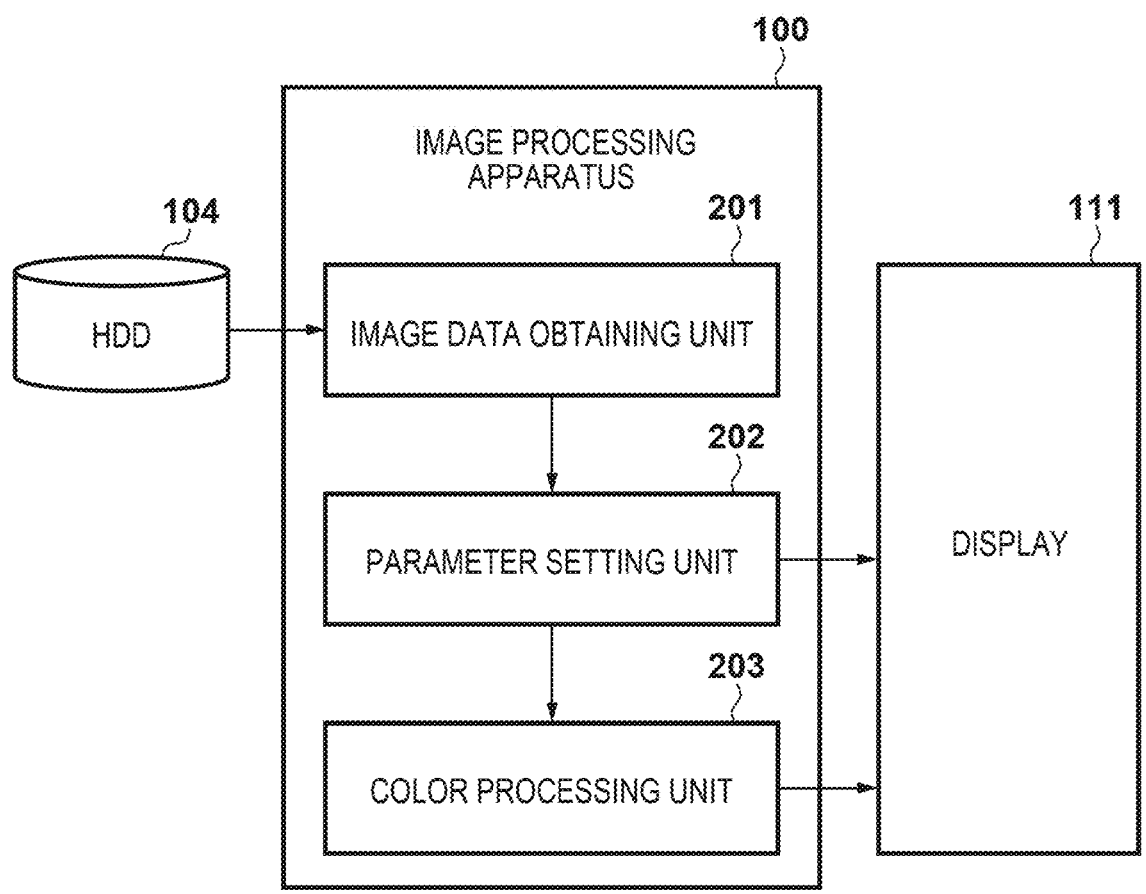
FIG. 2 is a functional block diagram of the image processing apparatus according to the first embodiment.

FIG. 2 is a functional block diagram of the image processing unit 100. An image data obtainment unit 201 obtains, from the HDD 104 via the HDD I/F 105, input image data and normal information of a subject that have been stored in advance. Alternatively, the input image data and the normal information of the subject can be obtained by connecting an image capturing apparatus (not shown) such as a digital camera or a 3D scanner to the image processing unit 100. Here, a normal map is used as the normal information.

FIG. 4 is a view showing examples of input image data and normal information. In input image data I shown in a schematic view 400a, RGB values Ir(i, j), Ig(i, j), and Ib(i, j) of a subject are stored as pixel values at coordinates (i, j). Also in a normal map N shown in a schematic view 400b, values of respective elements of a unit normal vector related to the subject are stored as pixel values at the coordinates (i, j). More specifically, xyz-component values of a normal vector corresponding to the coordinates (i, j) of the input image data I are stored as a pixel value N(i, j). That is, the pixel value $N(i, j)=(Nx(i, j), Ny(i, j), Nz(i, j))$. Here, note that xyz-coordinates are set on the basis of the coordinates in the input image data. More specifically, the horizontal direction of the input image data is set as the x-axis, the vertical direction is set as the y-axis, and the depth direction (that is, the optical-axis direction of the image capturing apparatus) is set as the z-axis. The obtained input image data and the normal map are transmitted to a parameter setting unit 202.

The parameter setting unit 202 displays, on the display 110 via the output I/F 107, a UI to make the settings related to each representative point. The parameter setting unit receives, via the input I/F 106, values instructed by a user on this UI and sets the coordinates of the representative point on the input image and an adjustment parameter corresponding to this representative point. The set coordinates and adjustment parameter of the representative point and the normal map are used to determine the adjustment parameter for each pixel in the input image. Details of these processes will be described later. The determined adjustment parameters are transmitted to a color processing unit 203.

The color processing unit 203 adjusts the white balance of the input image data by using the adjustment parameters and generates output image data. The generated output image data is transmitted to a display 111 and is displayed.

<Apparatus Operation>

Figure 3:
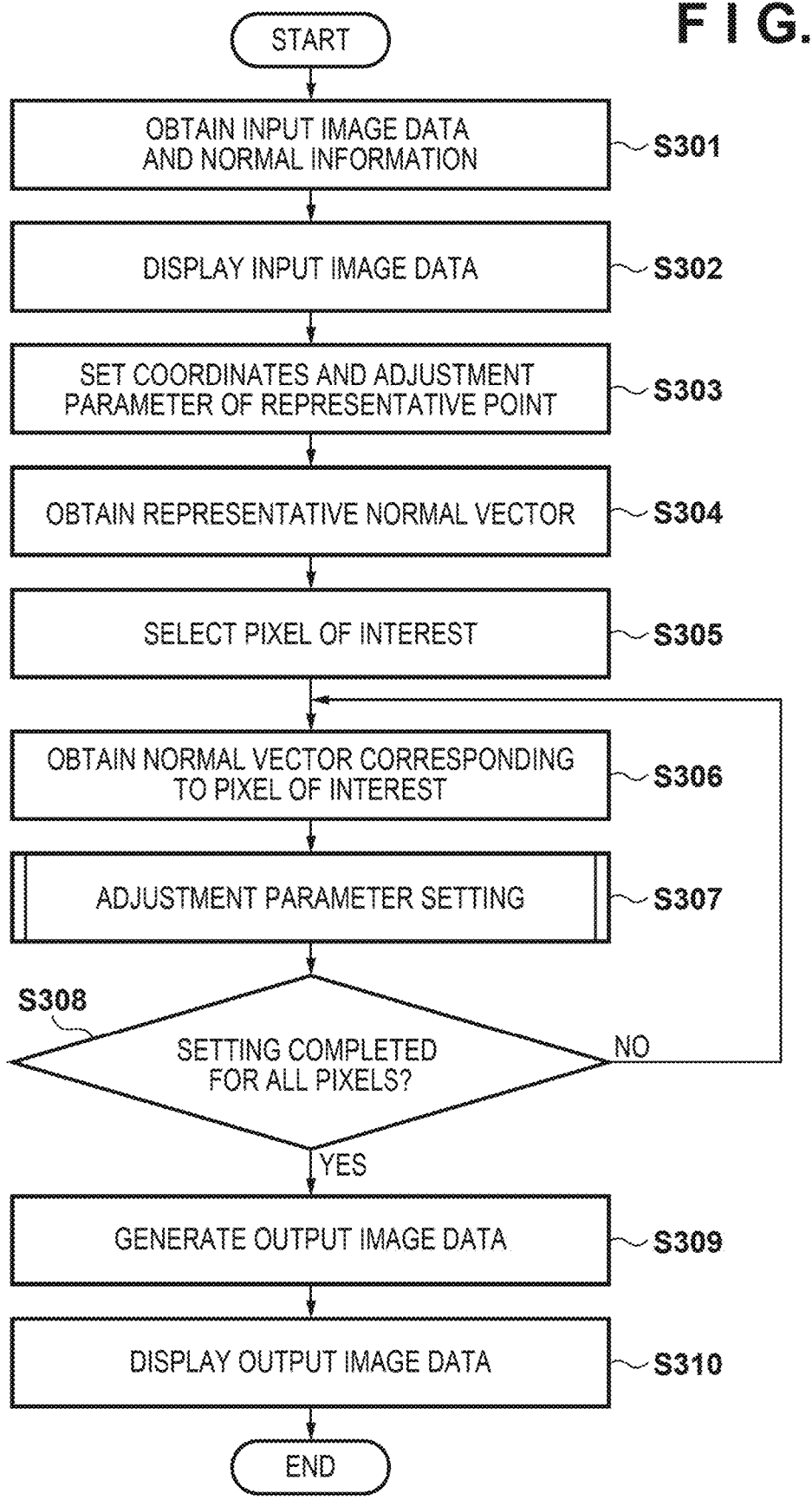
FIG. 3 is a flowchart of a series of processes according to the first embodiment.

FIG. 3 is a flowchart showing a series of processes according to the first embodiment. The series of processes are implemented by the CPU 101 by loading, from the ROM 103 or the HDD 104 to the RAM 102, a computer executable program in which a procedure to be shown hereinafter is described, and executing the program.

In step S301, the image data obtainment unit 201 obtains, from the HDD 104 or the image capturing apparatus, input image data and a normal map which is the normal information corresponding to the input image data. In step S302, the input image data obtained in step S301 and a UI to make the settings related to a representative point are output to and displayed on the display 110 by the parameter setting unit 202.

Figure 5:
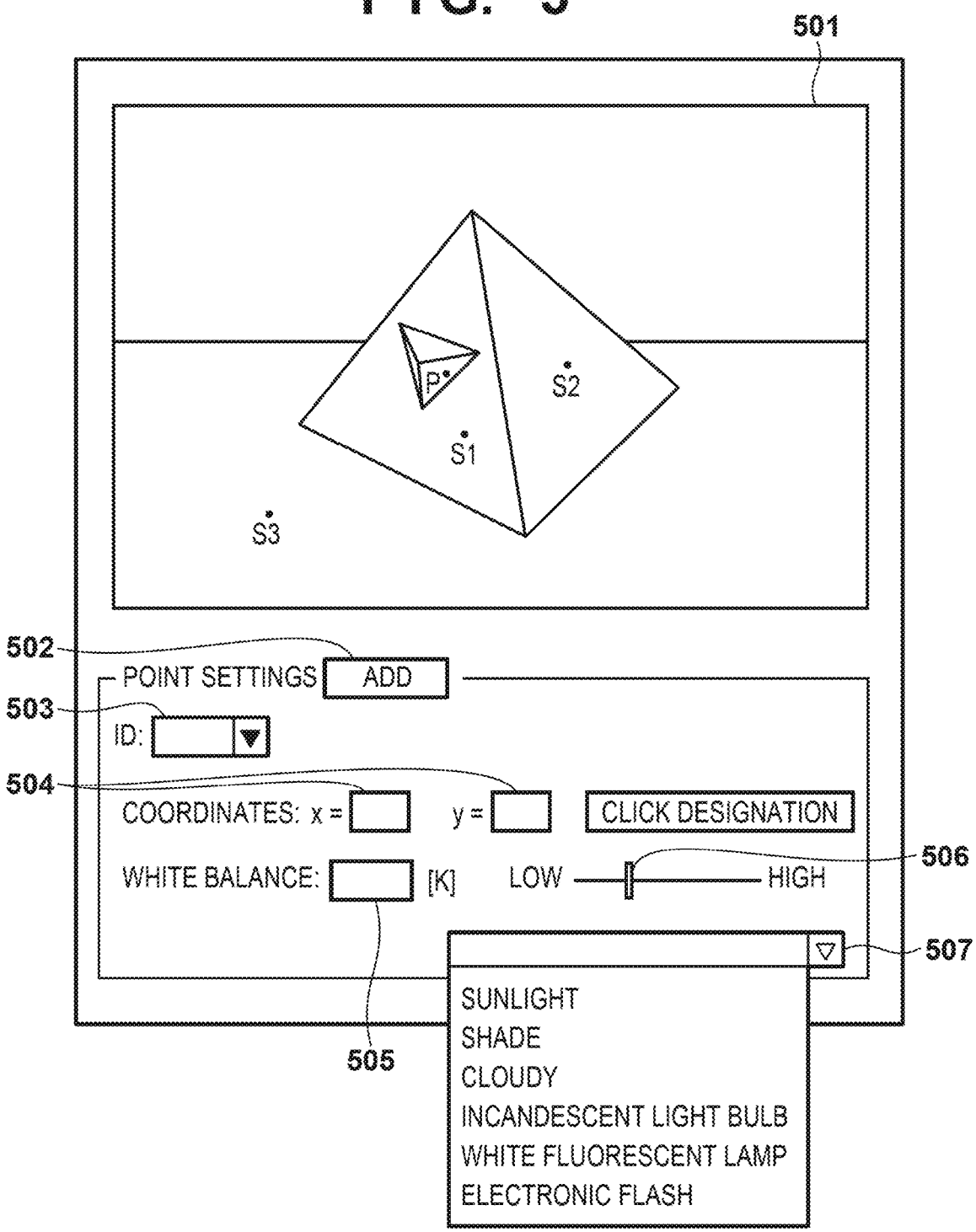
FIG. 5 is a view showing an example of a UI.

FIG. 5 is a view showing an example of the UI to make the settings related to the representative point. An image display region 501 is a region where the input image data is displayed. The user can refer to the displayed input image data to make the settings related to the representative point via the UI.

In step S303, the parameter setting unit 202 obtains the values instructed by the user on the UI displayed in step S302 and sets the coordinates and the adjustment parameter of the representative point. In the example of FIG. 5, a representative point that is newly assigned with an ID is generated when an "ADD" button 502 is pressed, and the ID is selected in an ID selection list 503. When coordinate values are input in coordinate setting fields 504 by the user, these values are set as the coordinates of the representative point that is selected in the ID selection list 503. When a color temperature value is input to an adjustment parameter setting field 505 by the user, a color temperature is set as the adjustment parameter (representative parameter) of the selected representative point. When the coordinates and the adjustment parameter of an existing representative point are to be changed, new values are input to the coordinate setting fields 504 and the adjustment parameter setting field 505 in a state in which the ID of this representative value is selected in the ID selection list 503. Note that instead of directly inputting numerical values, the coordinate values may be input to the coordinate setting fields 504 by clicking a point in the image display region 501 and obtaining the coordinate values (i, j) corresponding to the point on the image. Also, instead of directly inputting numerical values, the color temperature may be input via a range slider 506 or a value corresponding to the light source selected via a preset light source list 507 may be input as the color temperature. In the description to be given below, K is the total number of generated representative points, and k (k=1, 2, . . . , K) is an ID which is assigned to a representative point.

In step S304, the parameter setting unit 202 obtains, from the normal map, a normal vector $N(i_{sk}, j_{sk})$ corresponding to coordinates $(i_{sk}, j_{sk})$ of each representative point Sk (k=1, 2, . . . , K) set in step S303 and sets the obtained normal vector as a representative normal vector $N_{sk}$. Here, assume that $N(i_{sk}, j_{sk})=(Nx(i_{sk}, j_{sk}), Ny(i_{sk}, j_{sk}), Nz(i_{sk}, j_{sk}))$. Note that an average value or a median value of normal vectors corresponding to neighboring pixels of the coordinates $(i_{sk}, j_{sk})$ may be used as the representative normal vector $N_{sk}$.

In step S305, the parameter setting unit 202 sets a pixel $P(i_p, j_p)$ of interest by selecting, among the pixels forming the input image, a pixel that has not been set with an adjustment parameter. In step S306, the parameter setting unit 202 obtains, from the normal map, a normal vector $N_p=(Nx(i_p, j_p), Ny(i_p, j_p), Nz(i_p, j_p))$ corresponding to coordinates $(i_p, j_p)$ of the pixel P of interest selected in step S305. In step S307, the parameter setting unit 202 sets an adjustment parameter to the pixel of interest selected in step S305.

Figure 6:
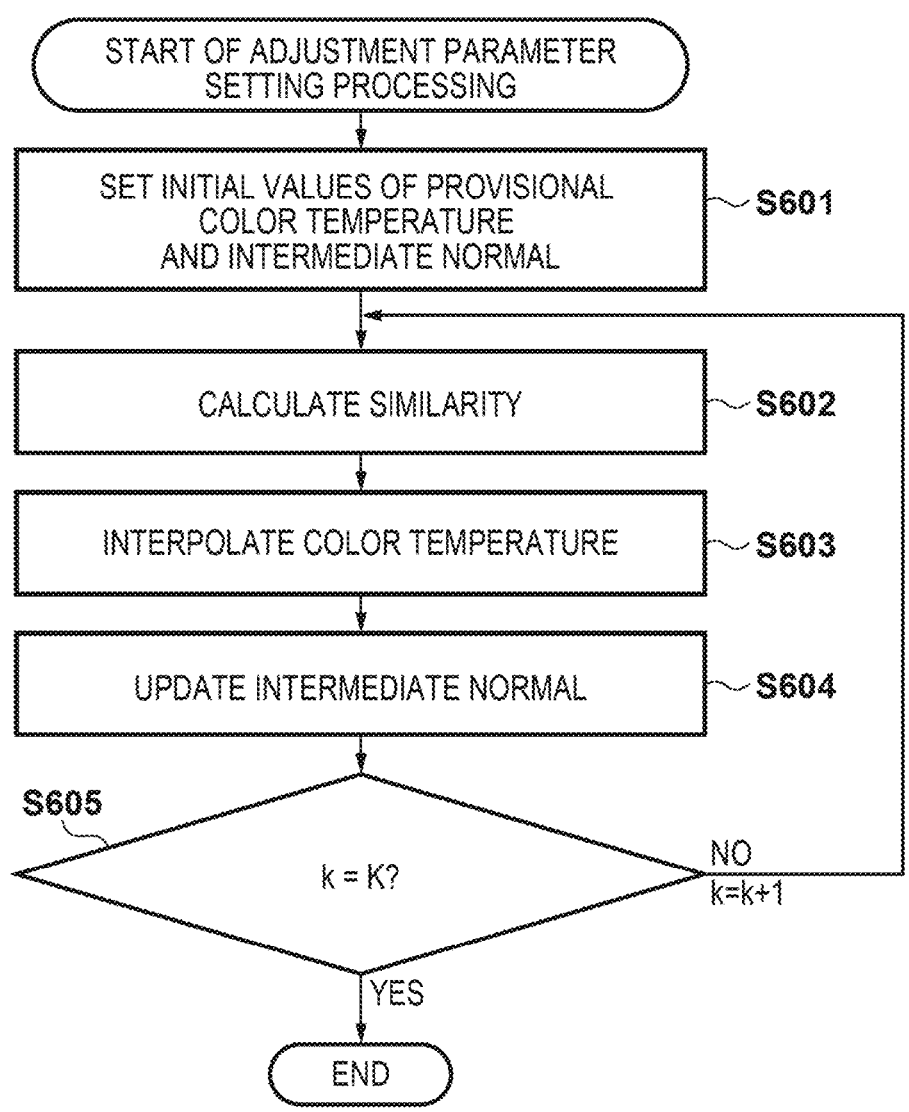
FIG. 6 is a detailed flowchart of adjustment parameter setting processing.

FIG. 6 is a detailed flowchart of adjustment parameter setting processing (step S307). Although a description regarding k=2 will be given below, the same processing will be performed for k=3 to K in steps S602 to S605.

In step S601, the parameter setting unit 202 stores a color temperature $T_{s1}$ of a representative point S1 as a provisional color temperature $T'_p$ of the pixel P of interest. A representative normal vector $N_{s1}$ is stored as an intermediate normal vector $N'_p$ of the pixel P of interest.

In step S602, the parameter setting unit 202 calculates a similarity α between the normal vectors of a kth representative point and the pixel of interest. More specifically, the normal vector $N_p$ corresponding to the pixel of interest, the representative normal vector $N_{sk}$, and the intermediate normal vector $N'_p$ are converted into a polar coordinate system. Each normal vector is converted from orthogonal coordinates (x,y,z) to polar coordinates (r, θ, φ) in accordance with $$r = \sqrt{x^2 + y^2 + z^2} \quad (1)$$
$$\theta = \cos^{-1}\left(\frac{y}{\sqrt{x^2 + y^2 + z^2}}\right)$$
$$\varphi = \cos^{-1}\left(\frac{x}{\sqrt{x^2 + z^2}}\right)$$

Figure 7:
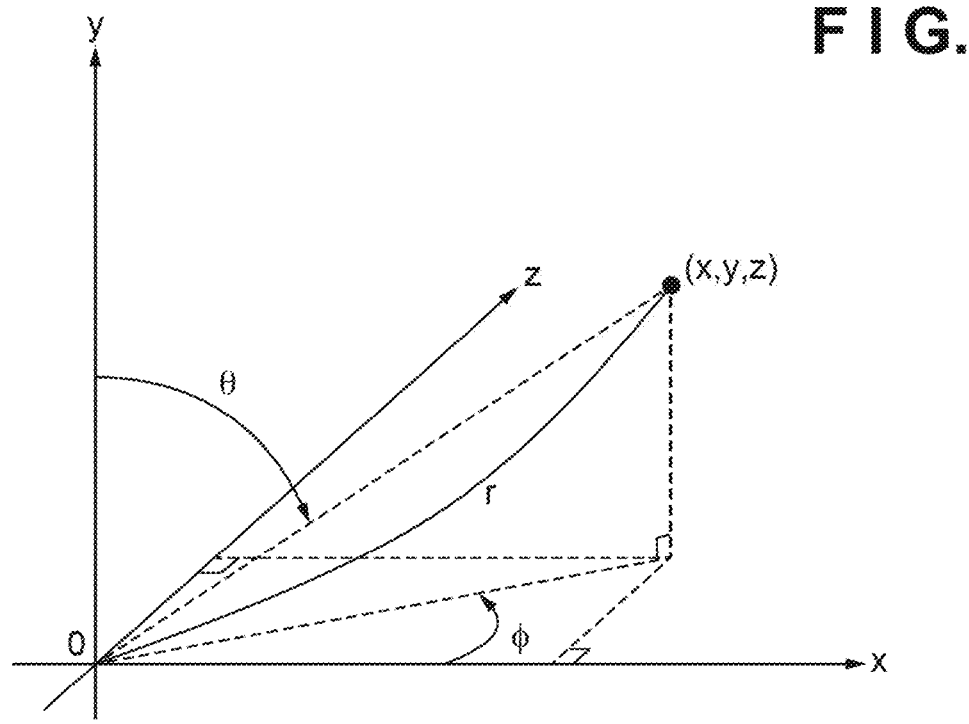
FIG. 7 is a graph for explaining a coordinate system.

FIG. 7 is a graph for explaining a coordinate system. More specifically, FIG. 7 shows the relationship between x, y, and z which are the parameters of the orthogonal coordinate system and r, θ, and φ which are the parameters of the polar coordinate system. In the example of this graph, a negative value is set for the z component of the normal vector of the subject captured (that is, facing the direction the image capturing apparatus) in the input image data. φ is set with a value in the range from π to 2π, and θ is set with a value in the range from 0 to π. Note that since the normal map stores a unit normal vector here, the value of r is constantly "1" in accordance with equation (1).

Next, the similarity α is calculated by using the representative normal vector $N_{sk}$, the normal vector $N_p$ corresponding to the pixel of interest, and the intermediate normal vector $N'_p$ represented by polar coordinates.

Figure 8:
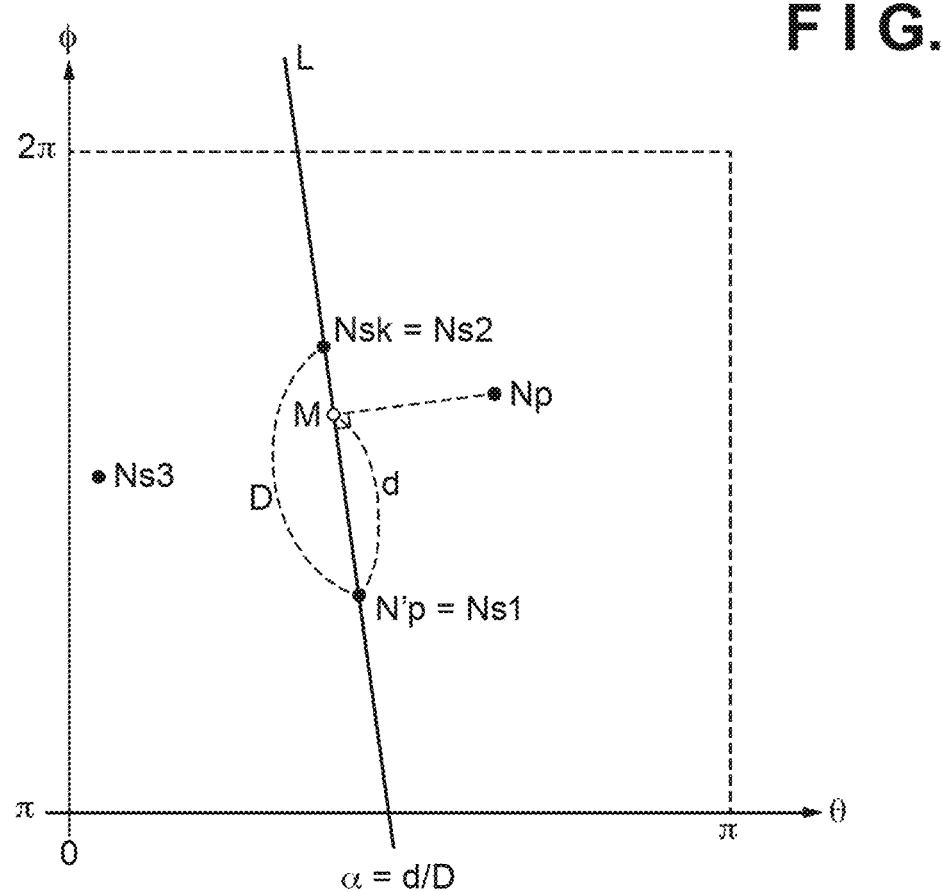
FIG. 8 is a graph for explaining a similarity between normal vectors.

FIG. 8 is a graph for explaining the similarity α between the normal vectors. FIG. 8 is an example in which the normal vectors at k=2 have been plotted on a θ-φ plane. A line L is a line that passes through the point $N'_p$ and the point $N_{sk}$, and a point M is the foot of a perpendicular line drawn from the point N, to the line L. Here, a distance d from the point $N'_p$ to the point M in FIG. 8 are normalized by using a distance D from the point $N'_p$ to the point $N_{sk}$. Then, the obtained value is used as the similarity α between the normal vector $N_p$ of the pixel of interest and the representative vector $N_{sk}$. At this time, α is represented by $$\alpha = \frac{d}{D} = \frac{1}{|Nsk - N'p|} * \left\{ \frac{Nsk - N'p}{|Nsk - N'p|} \cdot (Np - N'p) \right\} \quad (2)$$

The similarity α is set as α=0 when the point M matches the intermediate normal vector N'P, and is set as α=1 when the point M matches the representative normal vector $N_{sk}$.

In step S603, the parameter setting unit 202 performs interpolation calculation to derive the color temperature of the pixel of interest based on the similarity α calculated in step S602. Here, the color temperature $T_{ak}$ of the representative point, the provisional color temperature $T'_p$, and the similarity α are used. Then a color temperature $T_p(i_p, j_p)$ of the coordinates $(i_p, j_p)$ of the pixel P of interest is derived by $$Tp(ip, jp) = \begin{cases} T'p & \alpha < 0 \text{ and } \begin{cases} T'p < Tth0 \text{ and } 0 < \Delta T \\ \text{or} \\ Tth1 < T'p \text{ and } \Delta T < 0 \end{cases} \\ Tsk & 1 < \alpha \text{ and } \begin{cases} Tsk < Tth0 \text{ and } \Delta T < 0 \\ \text{or} \\ Tth1 < Tsk \text{ and } 0 < \Delta T \end{cases} \\ t & \text{otherwise} \end{cases} \quad (3)$$

$$t = \begin{cases} Tth0 & tl < Tth0 \\ tl & Tth0 \leq tl \leq Tth1 \\ Tth1 & Tth1 < tl \end{cases}$$

$$tl = T'p + \alpha * \Delta T, \Delta T = Tsk - T'p$$

where $T_{th0}$ and $T_{th1}$ are a lower limit value and an upper limit value, respectively, of a predetermined color temperature. The color temperature of sunlight and light fixtures, which are typical sources of lighting, is about 2000 [K] for a low color temperature light source such as a sunset or a candle flame, and is about 12000 [K] for a high color temperature light source such as a sunny sky. Hence, in this case, assume that $T_{th0}$=2000 and $T_{th1}$=12000. In equation (3), if the interpolation is to be an extrapolation (α<0 or 1<α), the interpolation method is switched in accordance with the values of the respective color temperatures $T'_p$ and $T_{sk}$ and a difference value ΔT between these color temperature values.

Figure 9:
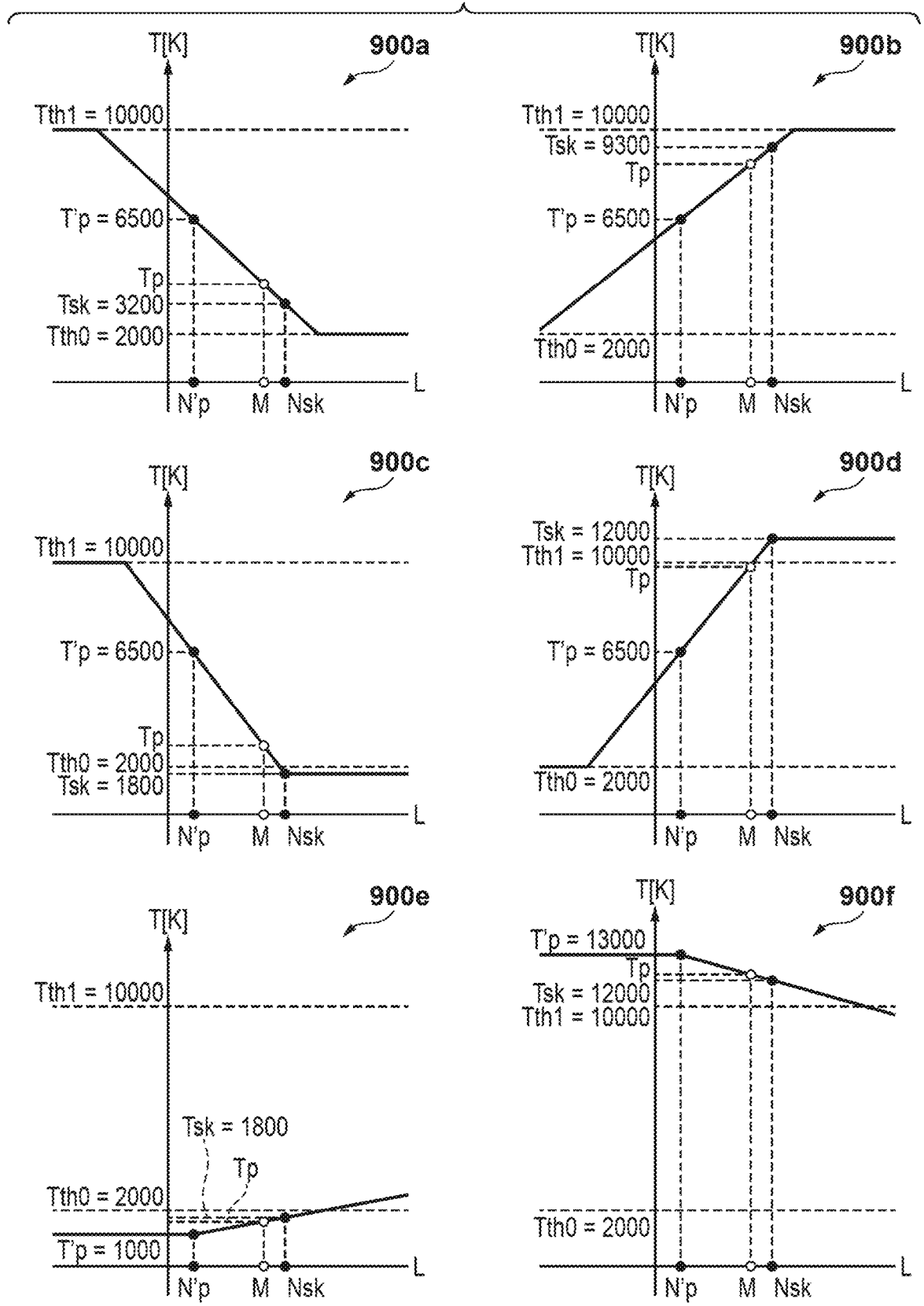
FIG. 9 is a view showing examples of interpolation based on adjustment parameters.

FIG. 9 is a view showing examples of interpolation based on the adjustment parameter. Graphs 900a to 900f each show an example of interpolation using equation (3). The graphs 900a and 900b are examples of cases in which the provisional color temperature $T'_p$ and the color temperature $T_{sk}$ are present between [$T_{th0}$, $T_{th1}$]. In these cases, the color temperature $T_p$ of the pixel of interest is interpolated within the range of [$T_{th0}$, $T_{th1}$]. The graphs 900c to 900f are examples of cases in which the color temperature $T_{sk}$ of the representative point is not present between [$T_{th0}$, $T_{th1}$]. In these cases, the color temperature $T_p$ of the pixel of interest is interpolated so as not to fall outside the range of [$T_{th0}$, $T_{th1}$].

In step S604, the parameter setting unit 202 obtains, based on the similarity α calculated in step S602, a normal vector corresponding to the point M in FIG. 8 in accordance with the following Equation (4) and stores the obtained normal vector as a new intermediate vector $N'_p$ of the pixel of interest.

$$M = N'p + \alpha*(Nsk - N'p) \quad (4)$$

In step S605, if k<K, the parameter setting unit 202 stores the color temperature $T_p(i_p, j_p)$ of the pixel of interest as the new provisional color temperature $T'_p$. Subsequently, the value of k is incremented by 1, and the process returns to step S602. If k=K, the color temperature of the pixel of interest is determined as $T_p(i_p, j_p)$.

In step S308, the parameter setting unit 202 determines whether the adjustment parameter has been set for all of the pixels in the input image. If the setting has been completed for all of the pixels, the process advances to step S309. Otherwise, the process returns to step S305.

In step S309, the color processing unit 203 adjusts the white balance of the input image data by using the adjustment parameter of each pixel set in step S307 and generates output image data. More specifically, gain coefficients $Gr(T_p(i, j))$, $Gg(T_p(i, j))$, and $Gb(T_p(i, j))$ corresponding to the color temperature $T_p(i, j)$ are used to multiply the RGB values $Ir(i, j)$, $Ig(i, j)$, and $Ib(i, j)$, respectively, of each pixel in the input image data in accordance with $$I'r(i,j) = Ir(i,j) * Gr(Tp(i,j))$$

$$I'g(i,j) = Ig(i,j) * Gg(Tp(i,j))$$

$$I'b(i,j) = Ib(i,j) * Gb(Tp(i,j)) \quad (5)$$

The obtained values are set as RGB values $I'r(i, j)$, $I'g(i, j)$, and $I'b(i, j)$.

The gain coefficients $Gr(T_p(i, j))$, $Gg(T_p(i, j))$, and $Gb(T_p(i, j))$ are determined by referring to a table that sets the correspondence relationship between the color temperature and the gain coefficients and is stored in advance. Note that in a case in which there is no color temperature that matches $T_p(i, j)$ on the table, a color temperature can be obtained by interpolation from the gain coefficients corresponding to neighboring color temperatures.

In step S310, the color processing unit 203 outputs the output image data generated in step S309 to the display 110 and displays the data.

As described above, according to the first embodiment, the white balance of a captured image can be easily and suitably adjusted by using the normal information corresponding to the subject in the image.

Note that although an example in which all of the representative points are set based on user instruction has been described above in step S303, some of the representative points may be set automatically based on the input image data and the normal map. For example, a color temperature that has been obtained from the entire input image data I by using a known automatic white balance method may be set as the color temperature $T_{s1}$ of the k=1st representative point S1. The average value or the median value of the normal vectors of the normal map N may be set as a representative normal vector N1.

In addition, although the above description has described an example in which the color temperature of the pixel of interest is interpolated by repetitively using the aforementioned equation (3) for each of the k=2 to K representative points, interpolation may be performed by using another method. It is possible to perform interpolation by using an arbitrary method in which a color temperature corresponding to a representative point whose normal vector direction is similar to that of a pixel of interest is greatly reflected in the interpolation result. For example, a color temperature T may be associated with an axis perpendicular to the θ-φ plane, and a curved surface that passes through K representative points in this three-dimensional space may be obtained by using a known spline interpolation or the like to calculate the color temperature of a pixel of interest from a point on the curved surface corresponding to the normal vector of the pixel of interest.

Second Embodiment

The second embodiment will describe an example in which a representative point is set automatically by using the normal information. Note that the hardware arrangement and the functional block arrangement of an image processing apparatus are the same as those in the first embodiment (FIGS. 1 and 2). In the operation of each functional unit, points different from those in the first embodiment will be mainly described hereinafter.

A parameter setting unit 202 determines a representative normal vector based on a predetermined representative point arrangement. The parameter setting unit performs region segmentation on input image data by using the representative normal vector and determines the white balance adjustment parameter corresponding to the representative normal vector based on the color temperature of each region.

Figure 10:
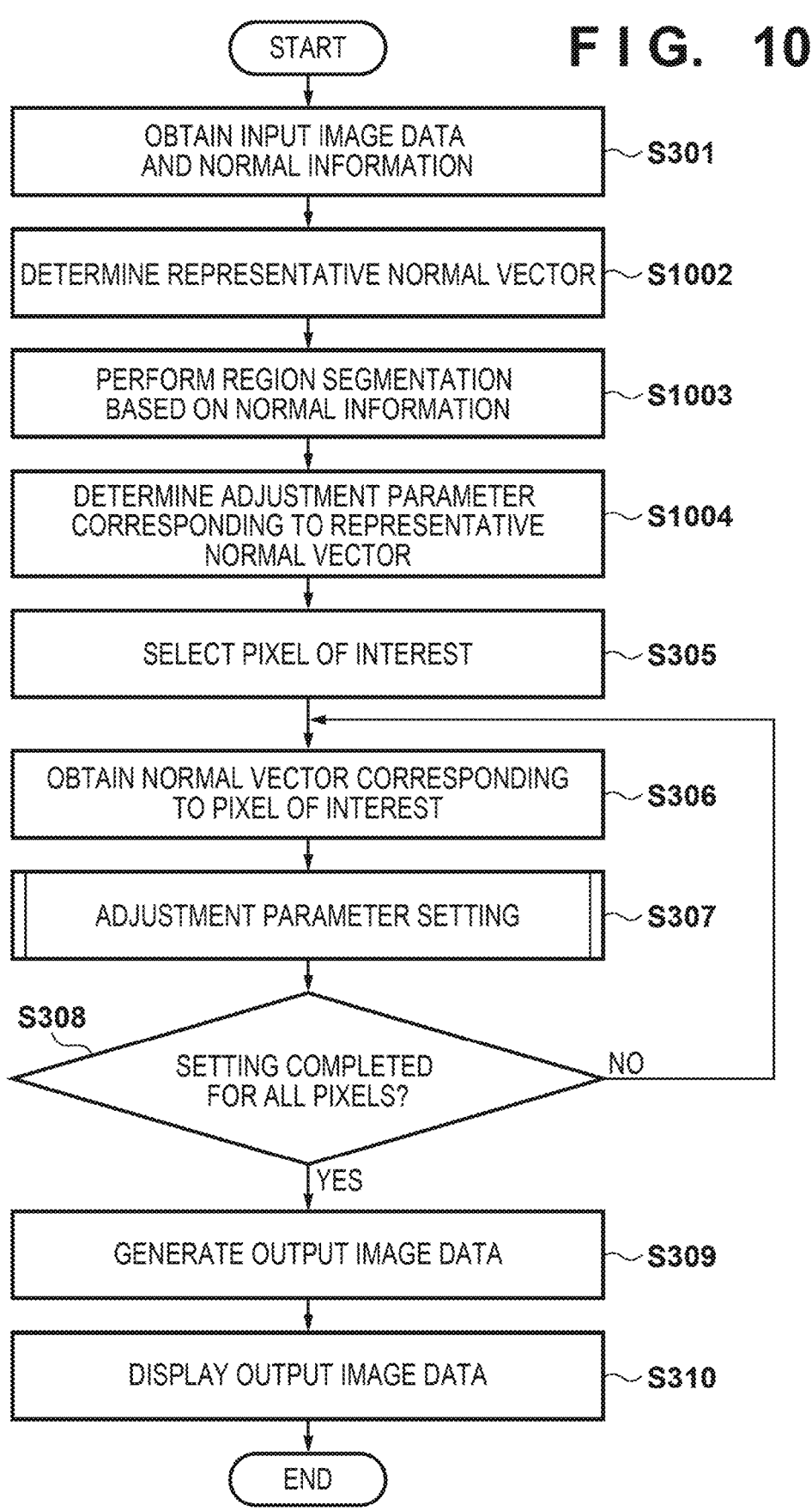
FIG. 10 is a flowchart of a series of processes according to the second embodiment.

FIG. 10 is a flowchart of a series of processes according to the second embodiment. Steps S301, S305 to S310 are the same as those in the first embodiment, and a description thereof will be omitted.

Figure 11:
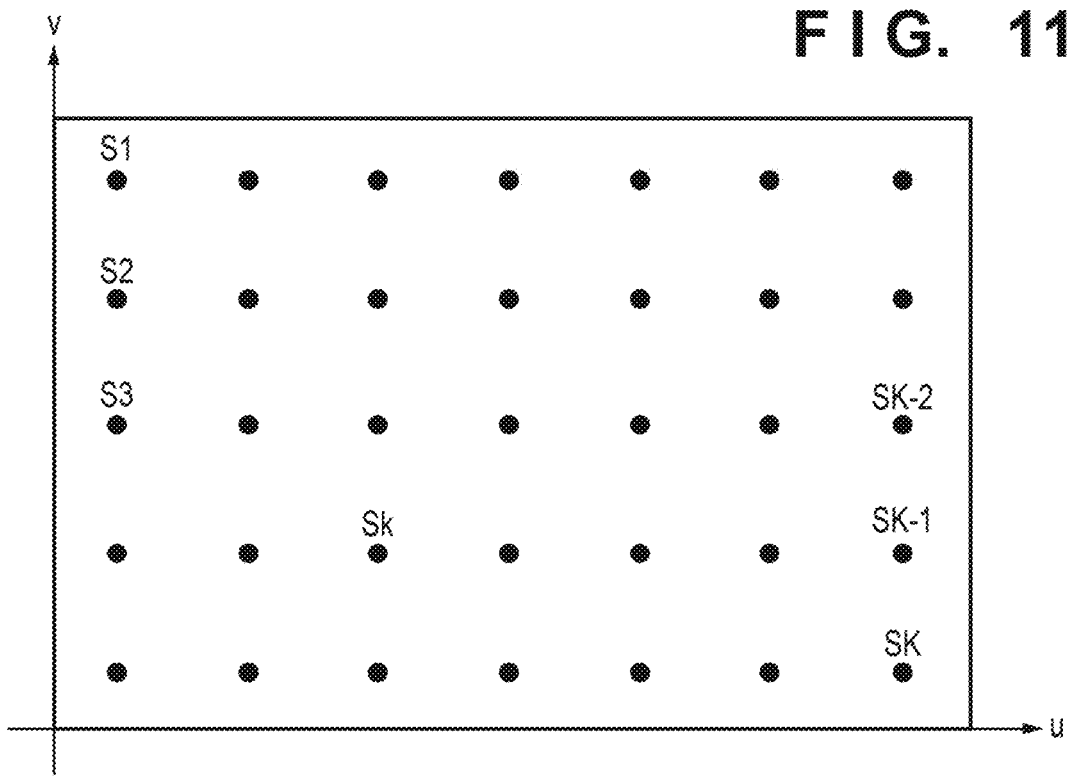
FIG. 11 is a view showing an example of a representative point arrangement.

In step S1002, the parameter setting unit 202 obtains a predetermined representative point arrangement from a storage device such as an HDD 104. The parameter setting unit obtains a normal vector stored in the coordinate corresponding to the representative point arrangement from the normal map obtained in step S301 and sets the obtained normal vector as a representative normal vector $N_{sk}$ (k=1, 2, ..., K). FIG. 11 is a view showing an example of the representative point arrangement. In FIG. 11, each black point represents a position of a representative point. When obtaining the coordinate corresponding to the representative point arrangement on the normal map, the abscissa of the representative point arrangement can be scaled in accordance with the horizontal width of each normal map and the ordinate of the representative point arrangement can be scaled in accordance with the vertical width of each normal map. Note that the representative point arrangement is not limited to that shown in FIG. 11 and may be a different arrangement in accordance with an image capturing mode or the arrangement of a distance measuring point for focusing.

In step S1003, the parameter setting unit 202 uses the representative normal vector determined in step S1002 to perform region segmentation on the input image data, obtained in step S301, so that pixels that have similar normal vectors will belong to the same region. More specifically, the inner product between a normal vector $N(i, j)$ corresponding to coordinates $(i, j)$ of input image data I and each representative normal vector $N_{sk}$ (k=1, 2, ..., K) is calculated. Then, an ID (k=kmax) of a representative normal vector when the value of the inner product is maximum is obtained and the pixel of the coordinates $(i, j)$ is added to a region $R_{kmax}$.

In step S1004, the parameter setting unit 202 determines a white balance adjustment parameter $T_{sk}$ corresponding to the representative normal vector $N_{sk}$ based on the color information of each pixel belonging to a region $R_k$. A known white balance adjustment method can be used to determine the white balance adjustment parameter based on the color information. For example, gain coefficients $Gr_k$, $Gg_k$, and $Gb_k$ which cause average RBG values $Ir_k$, $Ig_k$, and $Ib_k$ of pixels belonging to the region $R_k$ to be achromatic values, are calculated by $$Grk = \frac{Igk}{Irk} \qquad (6)$$

$$Ggk = 1$$

$$Gbk = \frac{Igk}{Ibk}$$

Next, a color temperature corresponding to the gain coefficients $Gr_k$, $Gg_k$, and $Gb_k$ is obtained by referring to a table that sets the correspondence relationship between the color temperature and the gain coefficients and is stored in advance. This color temperature is set as the white balance adjustment parameter $T_{sk}$ corresponding to the representative normal vector $N_{sk}$.

As described above, according to the second embodiment, the white balance of a captured image can be adjusted more easily than in the first embodiment.

Figure 12:
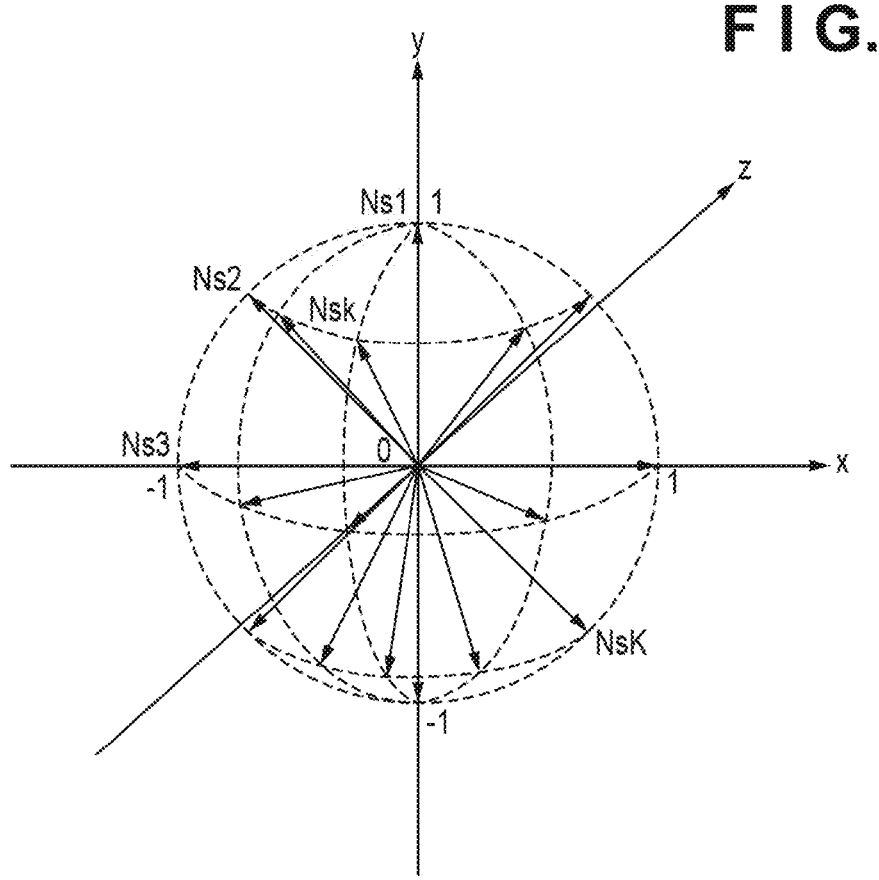
FIG. 12 is a graph showing an example of representative normal vectors.

Note that although the above step S1002 describes an example in which a representative normal vector is obtained from a normal map based on a predetermined representative point arrangement, a predetermined plurality of unit normal vectors may be obtained as the representative normal vectors. FIG. 12 is a graph showing an example of representative normal vectors.

Also, for example, it can be arranged so that a representative normal vector is obtained from the coordinates of a representative point instructed by a user by the processes of steps S302 to S304 described in the first embodiment, and a color temperature corresponding to the representative normal vector is determined by the processes of steps S1003 and S1004 described in the second embodiment.

Furthermore, although the first and second embodiments describe an example in which the color temperature is used as a white balance adjustment parameter, gain coefficients may be used as the white balance adjustment parameters. That is, it may be arranged so that gain coefficients of a representative normal vector are set in step S303 or S1004, and the gain coefficients of each pixel will be interpolated in step S307.

In addition, although the first and second embodiments describe an example in which a white balance adjustment parameter is obtained by using normal information that corresponds to input image data, the parameter may be obtained by using the normal information in combination with distance information. For example, the input image data may be separated into a foreground region and a background region based on the distance information, and the aforementioned processing can be applied to each region. In this case, even if the lighting environment of the foreground and that of the background greatly differ from each other and there are subjects that have similar normal vectors in the foreground and the background, it is possible to perform suitable white balance adjustment.

Third Embodiment

The third embodiment will describe an example in which a white balance adjustment parameter is determined by using, in addition to input image data and the corresponding normal information, feature amount information that defines a feature amount other than the normal information. Particularly, an example that uses distance information as the feature amount information will be described. Note that the hardware arrangement and the functional block arrangement of the image processing apparatus are the same as those in the first embodiment (FIGS. 1 and 2). Note that the distance information is used as the feature amount information, and gain coefficients are used as the adjustment parameters.

An image data obtainment unit 201 obtains distance information of a subject in addition to input image data and normal information of the subject. Here, a distance map is used as the distance information.

FIG. 13 is a view showing examples of an input image, normal information, and distance information. Schematic views 1300a to 1300c exemplify input image data I, a normal map N, and a distance map Z, respectively. Coordinates (i, j) of the distance map Z shown in the schematic view 1300c are associated with coordinates (i, j) of the input image data I, respectively. A pixel Z(i, j) of the distance map stores, as a pixel value, the distance (subject distance in the optical-axis direction) to the subject corresponding to a pixel I(i, j) of input image data from an image capturing apparatus that captured the input image data.

A parameter setting unit 202 displays a UI on a display 110 to make the settings related to a representative point in the same manner as in the first embodiment, and sets the coordinates of the representative point on the input image and the adjustment parameters corresponding to the representative point. Adjustment parameters for each pixel in the input image are calculated by using the coordinates and the adjustment parameters of the set representative point, a normal map, and a distance map. At this time, if there are a plurality of representative points with approximately matching pieces of normal information and different sets of adjustment parameters, an application amount (weighting coefficient) for the adjustment parameters of each representative point is calculated based on the distance information. The details of these processes will be described later. Each determined set of adjustment parameters is transmitted to a color processing unit 203.

Figure 14A:
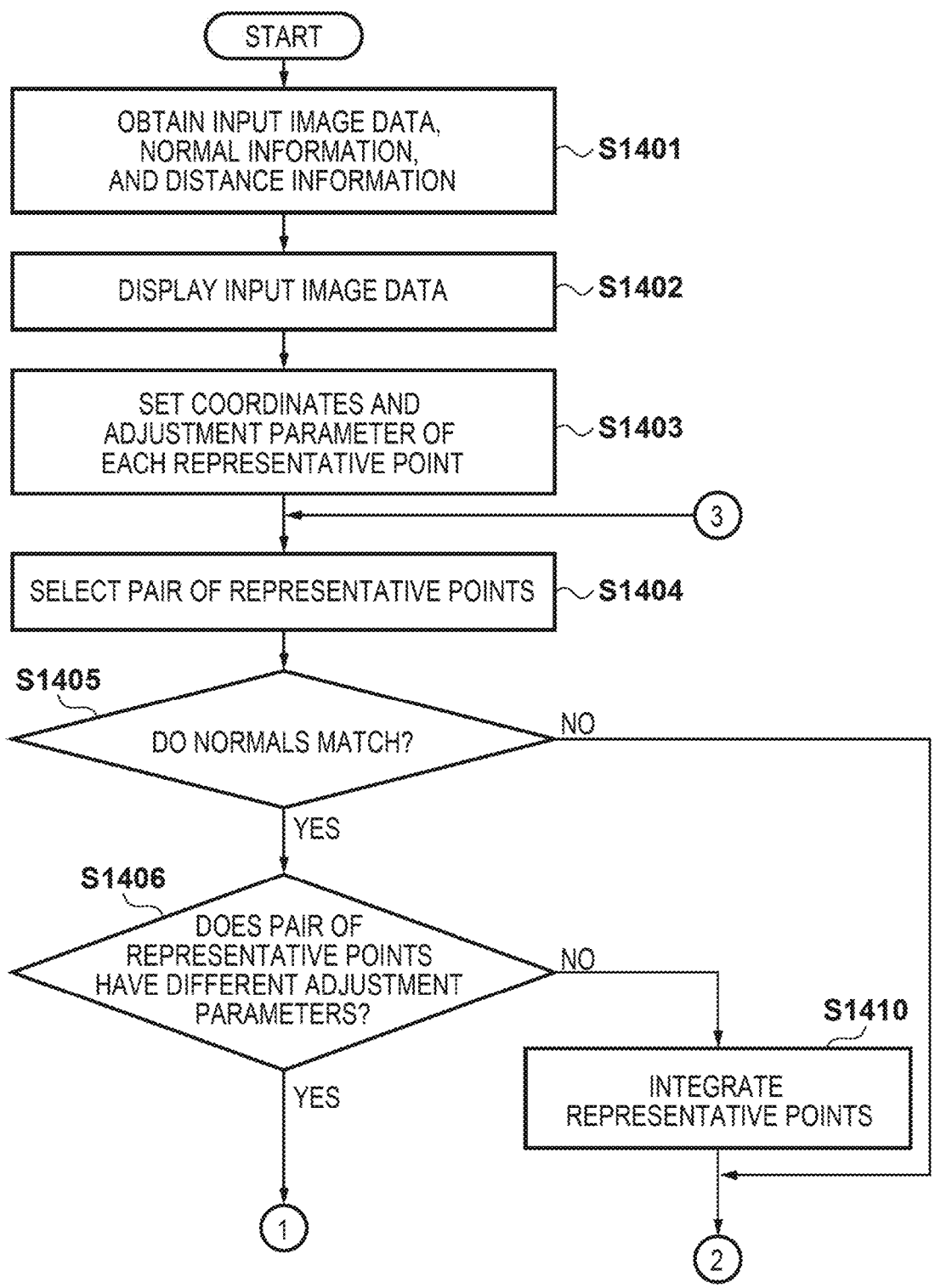

FIGS. 14A and 14B are flowcharts of a series of processes according to the third embodiment.

In step S1401, the image data obtainment unit 201 obtains input image data and a normal map and a distance map corresponding to the input image data from an HDD 104 or an image capturing apparatus. In step S1402, the parameter setting unit 202 outputs, to the display 110, the input image data obtained in step S1401 and the UI to make the settings related to a representative point and displays the data and the UI.

Figure 15:
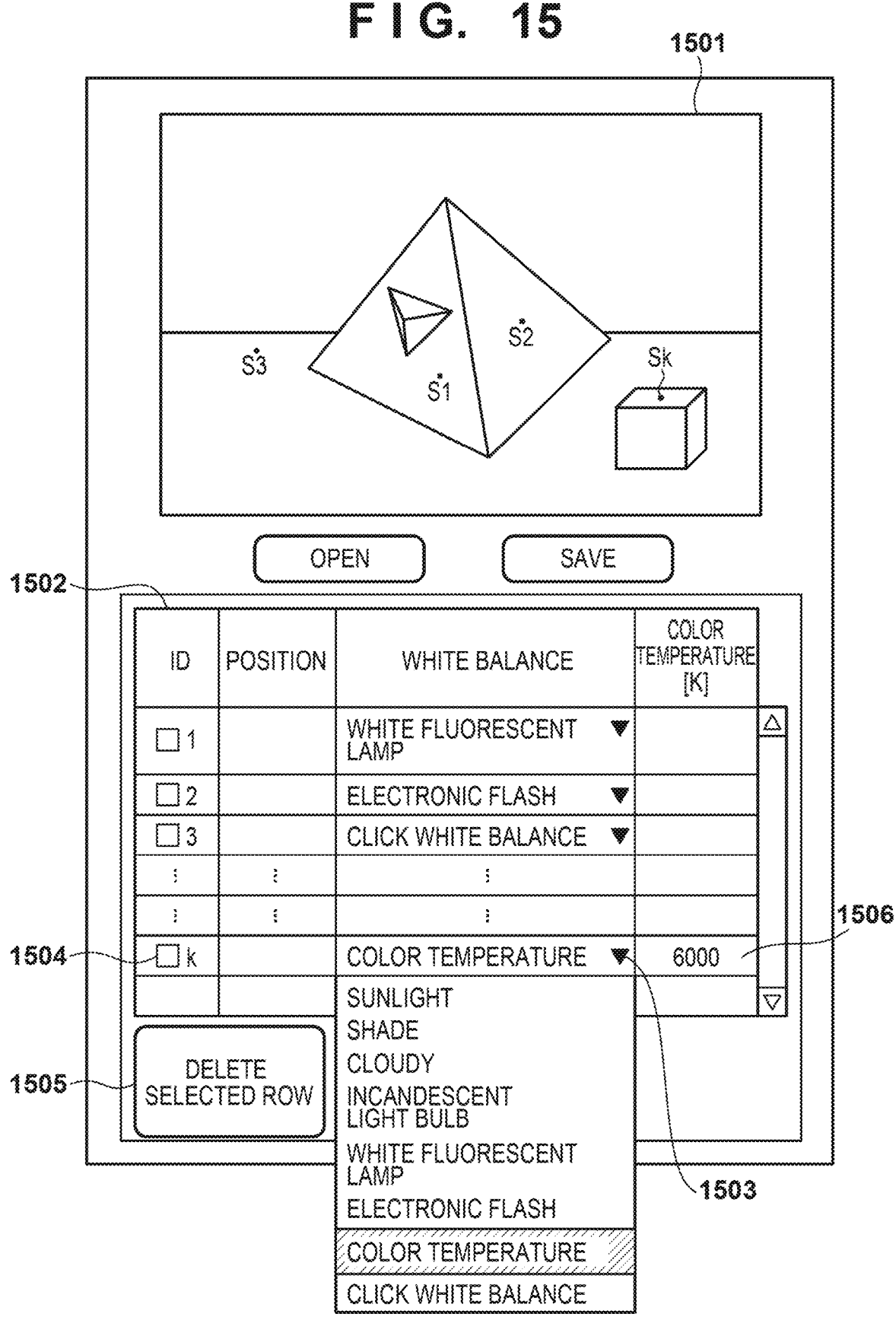
FIG. 15 is a view showing an example of a UI.

FIG. 15 is a view showing an example of the UI. The input image data is displayed on an image display region 1501 of FIG. 15. A user can set a representative point via the UI while referring to the displayed input image data.

In step S1403, the parameter setting unit 202 obtains a value instructed by the user via the UI displayed in step S1402, and sets the coordinates and the adjustment parameters of each representative point. In the example of FIG. 15, when a point on the image display region 1501 is selected, a representative point which is newly assigned with an ID is added to a representative point list 1502, and the coordinates (i, j) on the image corresponding to the selected point are set as the coordinates of the representative point. When a light source is selected from a preset light source list 1503 in a row corresponding to each representative point on the UI, gain coefficients corresponding to the selected light source are set as the adjustment parameters of the representative point.

When a "delete" button 1505 is pressed in a state in which a checkbox 1504 provided in each row of the adjustment parameter list is checked, the checked row is deleted from the adjustment parameter list, and the settings related to the corresponding representative point are discarded. Note that in a case in which "color temperature" is selected as a light source, gain coefficients corresponding to the color temperature input to a color temperature setting field 1506 of that row are set as the adjustment parameters. Also, in a case in which "click white balance" is selected, gain coefficients that can convert the RGB values of input image data corresponding to this representative point into achromatic values will be set as the adjustment parameters.

In step S1404, the parameter setting unit 202 selects two representative points Sk and Sk' (k, k'=1, 2, ..., K, k<k') from K representative points, set in step S1403, to make a pair of representative points.

In step S1405, the parameter setting unit 202 determines whether the pieces of normal information match between the pair of representative points selected in step S1404. More specifically, unit normal vectors $N_{sk}$ and $N_{sk'}$ corresponding to the coordinate pairs of the representative points Sk and Sk', respectively, are obtained from the normal map. If the inner product of these unit normal vectors is equal to or more than a predetermined threshold, it is determined that the normal vectors match. If it is determined that the normal vectors match, the process advances to step S1406. Otherwise, the process advances to step S1411.

In step S1406, the parameter setting unit 202 determines whether the pair of representative points determined as having matching normal vectors in step S1405 have different sets of adjustment parameters. More specifically, it is determined that the sets of adjustment parameters differ from each other if the gain coefficients corresponding to the representative point Sk and the gain coefficients corresponding to the representative point Sk' satisfy $$\left| \frac{Grk}{Ggk} * \frac{Ggk'}{Grk'} - 1 \right| + \left| \frac{Gbk}{Ggk} * \frac{Ggk'}{Gbk'} - 1 \right| > ThG \qquad (7)$$

where $Gr_k$, $Gg_k$, and $Gb_k$ represent gain coefficients corresponding to the representative point Sk, and $Gr_{k'}$, $Gg_{k'}$, and $Gb_{k'}$ represent gain coefficients corresponding to the representative point Sk'.

Here, ThG represents a predetermined threshold related to a gain coefficient ratio. For example, if ThG=0, in cases other than a case in which the gain coefficient ratios of R (red) and B (blue) to G (green) completely match between the representative points Sk and Sk', it is determined that the sets of adjustment parameters are different from each other. If it is determined that the sets of adjustment parameters are different from each other, the process advances to step S1407. Otherwise, the process advances to step S1410.

In step S1407, the parameter setting unit 202 determines whether the pieces of distance information differ between the pair of representative points determined to have matching pieces of normal information and different sets of adjustment parameters in steps S1405 and S1406. More specifically, subject distances $Z_{sk}$ and $Z_{sk'}$ corresponding to the coordinate pairs of the representative points Sk and Sk' are obtained from a distance map. If the absolute value of the difference between the subject distances is equal to or more than a predetermined threshold, it is determined that the subject distances are different from each other. If it is determined that the subject distances differ from each other, the process advances to step S1408. Otherwise, the process advances to step S1409.

In step S1408, the pair of representative points, which were determined to have matching pieces of normal information, different sets of adjustment parameters, and different subject distances in steps S1405 to S1407, are classified as distance weighting calculation targets by the parameter setting unit 202.

In step S1409, the parameter setting unit 202 sets, among the pair of representative points determined to have matching pieces of normal information with subject distances, and different sets of adjustment parameters in steps S1405 to S1407, one representative point as invalid. Here, a set of adjustment parameters that have been subsequently instructed is prioritized over a set of adjustment parameters that have been instructed by the user in advance, and the representative point Sk that has a smaller ID number is set as invalid. Note that a timestamp added when each representative point is set in step S1403 may be stored together with the coordinates and the adjustment parameters, and the representative point that has an older timestamp may be set as invalid.

In step S1410, the parameter setting unit 202 integrates the pair of representative points determined to have matching pieces of normal information and matching sets of adjustment parameters in steps S1405 and S1406. More specifically, the average value of unit normal vectors and the average value of the gain coefficients are obtained from the unit normal vectors and the gain coefficients corresponding to the pair of representative points Sk and Sk'. The obtained average values are stored as a new piece of normal information and new adjustment parameters for the subsequently set representative point Sk'. The settings related to representative value Sk set in advance are discarded. Alternatively, in the same manner as step S1409, one of the representative values may be set as invalid.

In step S1411, the parameter setting unit 202 determines whether the comparison in step S1405 has been completed for all the pairs formed by the set representative points. If the comparison has been completed for all the pairs, the process advances to step S1412. Otherwise, the process returns to step S1404.

In step S1412, the parameter setting unit 202 calculates the adjustment parameters for each pixel having the coordinates (i, j) forming the input image. First, for each representative point Sk that has been set, a weighting coefficient $W_{nk}(i, j)$ based on a normal vector similarity with the coordinates (i, j) is calculated by $$W_{nk}(i, j) = \begin{cases} \dfrac{\beta_k(i, j)}{\sum\limits_{l \in C_{valid}} \beta_l(i, j)} & k \in C_{valid} \\ 0 & \text{otherwise} \end{cases} \qquad (8)$$

$$\beta_k(i, j) = \begin{cases} Nij \cdot Nsk & Nij \cdot Nsk > 0 \\ 0 & \text{otherwise} \end{cases}$$

where $C_{valid}$ represents a set of IDs indicating valid representative points (that is, representative points not set as invalid). $N_{ij}$ and $N_{sk}$ are unit normal vectors that correspond to the coordinates (i, j) and the representative point Sk, respectively, obtained from the normal map.

$\beta_k$ (i, j) in equation (8) corresponds to the similarity between the normal vector of the coordinates (i, j) and the normal vector of the representative point Sk, and its value increases the more similar the normal vector of the coordinates (i, j) and that of the representative point Sk are. The weighting coefficient $W_{nk}(i, j)$ in equation (8), for each valid representative point, is a value obtained by normalizing the similarity of the normal vectors by using the total sum of all the representative points excluding the invalid representative points. The larger the value of $\beta_k(i, j)$, the larger the value of the weighting coefficient ($0 \leq W_{nk}(i, j) \leq 1$). The weighting coefficient $W_{nk}(i, j)$ is always "0" for an invalid representative point.

Next, in the same manner, for every representative point Sk, a weighting coefficient $W_{zk}(i, j)$ based on the similarity in the distance with the coordinates (i, j) is calculated by $$W_{zk}(i, j) = \begin{cases} \dfrac{\gamma_k(i, j)}{\sum_{l \in C(Sk)} \gamma_l(i, j)} & k \in C(Sk) \\ 1 & \text{otherwise} \end{cases} \quad (9)$$

$$\gamma_k(i, j) = \Delta z_{max} - \Delta z_k(i, j)$$

$$\Delta z_k(i, j) = |Zij - Zsk|$$

where C(Sk) represents a set of IDs indicating, among the representative points classified into distance weighting calculation targets, representative points whose normal vectors match the normal vector of the representative point Sk. $Z_{ij}$ and $Z_{sk}$ are subject distances corresponding to the coordinates (i, j) and the representative point Sk, respectively, obtained from the distance map Z. $\Delta z_{max}$ is the maximum value of $\Delta z_l(i, j)$ ($l \in C(Sk)$). $\gamma_k(i, j)$ of equation (9) corresponds to the similarity between the subject distance of the coordinates (i, j) and the subject distance of the representative point Sk. The more similar the subject distance of the coordinates (i, j) and the subject distance of the representative point Sk are, the larger the value of $\gamma_k(i, j)$.

For a representative point that is a distance weighting calculation target, the weighting coefficient $W_{zk}(i, j)$ in equation (9) is a value obtained by normalizing the similarity in the subject distances by using the total sum of all the representative points with matching normal vectors. Hence, the larger the value of $\gamma_k(i, j)$, the larger the value of the weighting coefficient $W_{zk}(i, j)$ ($0 \leq W_{zk}(i, j) \leq 1$). The weighting coefficient $W_{zk}(i, j)$ of a representative point that is not classified as a distance weighting calculation target is always set to "1".

Finally, the gain coefficients $Gr_k$, $Gg_k$, and $Gb_k$ of each representative point and the weighting coefficients $W_{nk}(i, j)$ and $W_{zk}(i, j)$ are used to calculate gain coefficients Gr(i, j), Gg(i, j), and Gb(i, j) by $$\begin{pmatrix} Gr(i, j) \\ Gg(i, j) \\ Gb(i, j) \end{pmatrix} = \sum_k \left( w_{nk}(i, j) * W_{zk}(i, j) * \begin{pmatrix} Grk \\ Ggk \\ Gbk \end{pmatrix} \right) \quad (10)$$

where a product of weighting coefficients $W_{nk}(i, j) * W_{zk}(i, j)$ corresponds to an application amount of the adjustment parameters of the representative point Sk to a pixel of the coordinates (i, j). The gain coefficients of a representative point having a normal vector with a direction similar to that of the normal vector of the coordinates (i, j) is reflected largely on the gain coefficients obtained by equation (10). Furthermore, in a case in which different sets of gain coefficients have been set to a plurality of representative points having approximately matching pieces of normal information, the gain coefficients will be reflected largely from a representative point having a subject distance similar to the subject distance of the coordinates (i, j) among the representative points that have the same normal vectors.

Note that since $W_{nk}(i, j)=0$ for an invalid representative point in equation (8), the application amount of the adjustment parameter of the representative point is "0".

In step S1413, the color processing unit 203 uses the adjustment parameters of each pixel calculated in step S1412, and the RGB values of the output image data are calculated by $$I'r(i,j)=Ir(i,j)*Gr(i,j)$$

$$I'g(i,j)=Ig(i,j)*Gg(i,j)$$

$$I'b(i,j)=Ib(i,j)*Gb(i,j) \quad (11)$$

More specifically, RGB values Ir(i, j), Ig(i, j), and Ib(i, j) of each pixel in the input image data are converted into RGB values I'r(i, j), I'g(i, j), and I'b(i, j) of the output image data.

In step S1414, the color processing unit 203 outputs the output image data generated in step S1413 to the display 110 and displays the output image data.

As described above, according to the third embodiment, even in a case in which subject surfaces having similar normal vectors are present across regions that have different illumination environments, the white balance of a captured image can be adjusted suitably.

Note that although the third embodiment has described an example in which the subject distance is used as a feature amount other than the normal information, another feature amount may be used. For example, it is possible to use a subject recognition result or the like which is obtained by applying known object recognition processing to the three-dimensional positional coordinates of a subject, coordinates on a two-dimensional plane, color information (brightness, saturation, chromaticity, and hue) of the input image data, and the input image data. In addition, a plurality of these feature amounts may be used in combination. In any case, it is sufficient to determine whether a feature amount other than the normal information differs between the pair of representative points in step S1407, and to classify a pair, which has been determined as having different feature amounts from each other, as weighting calculation targets based on the feature amount in step S1408. When a weight is to be calculated based on the feature amount in step S1412, the weighting coefficient can be calculated based on the similarity of the feature amount of each representative point so that a representative point having a feature amount similar to that of the pixel of interest will have a large weight.

Furthermore, in a case in which the coordinate pairs match between the pair of representative points selected in the above-described step S1404, it may be regarded that the user has re-instructed the adjustment of the coordinate pairs, and the representative point that has been set previously may be set as invalid. In this case, the process can advance to step S1409 by omitting the processes of steps S1405 to S1407.

Fourth Embodiment

The fourth embodiment will describe an example in which a representative normal vector is determined based on the distribution of normal information. The fourth embodiment will also describe an example in which the white balance adjustment parameter of each pixel in input image data is determined in accordance with a region to which the pixel belongs. Note that the hardware arrangement and the functional block arrangement of an image processing apparatus are the same as those in the above-described embodiments (FIGS. 1 and 2). In the operation of each functional unit, points different from those in the first embodiment will be mainly described hereinafter.

Figure 16:
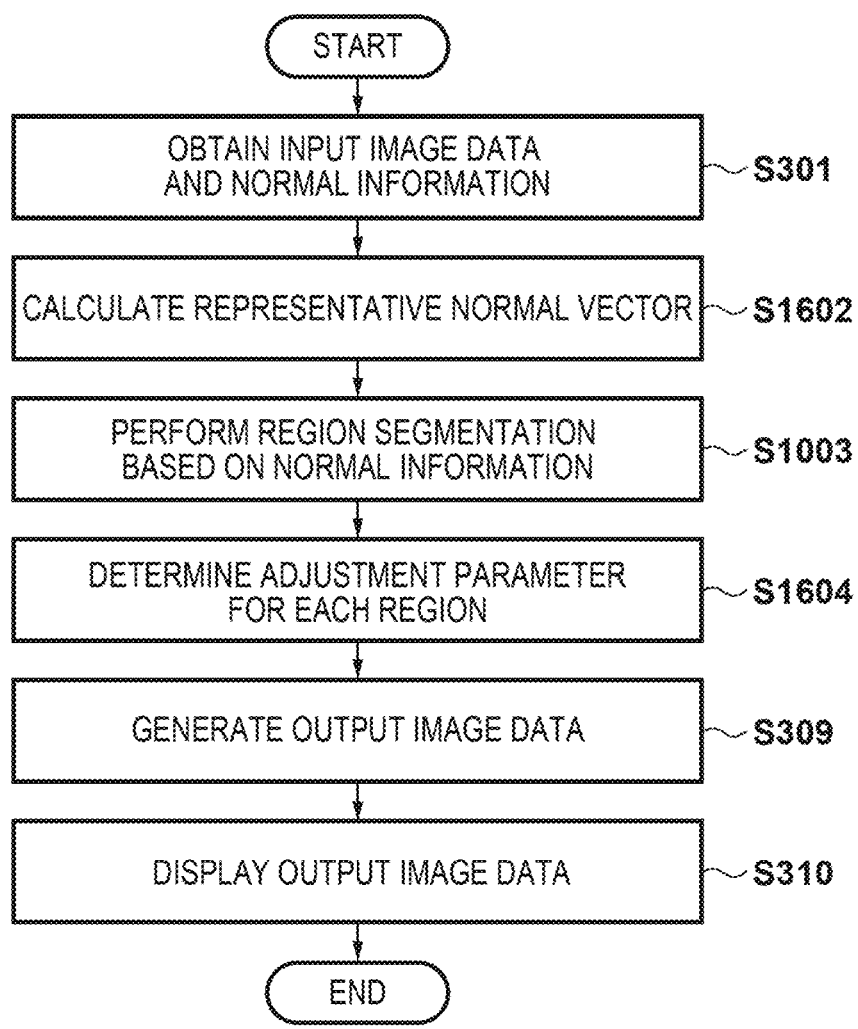
FIG. 16 is a flowchart of a series of processes according to the fourth embodiment.

FIG. 16 is a flowchart of a series of processes according to the fourth embodiment. Steps S301, S1003, S309, and S310 are the same as those in the above-described embodiments, and a description thereof will be omitted.

In step S1602, a parameter setting unit 202 analyzes a normal vector distribution included in a normal map obtained in step S301, and calculates a representative normal vector $N_{sk}$ (k=1, 2, . . . , K). More specifically, the normal vectors in the normal map are classified into K clusters by using a known clustering method, and a vector corresponding to the center of each cluster is set as a representative normal vector. At this time, the cluster count K may be a predetermined number or may increase in accordance with the magnitude of the distribution of the normal vectors included in the normal map.

In step S1604, the parameter setting unit 202 determines the color temperature as a white balance adjustment parameter for each region segmented in step S1003. Since each region is a set of pixels that have similar normal vectors, for each pixel in the input image data, a color temperature $T_{sk}$ corresponding to a region $R_k$ to which the pixel belongs is determined as the color temperature of the pixel. It is possible to use a known automatic white balance adjustment method, in the same manner as step S1004, to determine the color temperature of the region.

As described above, according to the fourth embodiment, it is possible to set a representative normal vector that represents a subject surface direction without excess or deficiency in accordance with the normal vector distribution of the subject. In addition, a white balance adjustment parameter can be determined for each pixel by simple processing.

Fifth Embodiment

The fifth embodiment will describe an example in which 3D model data that represents the three-dimensional shape of a main subject is used as the normal information. The fifth embodiment will also describe an example in which, after adjusting the white balance of an entire image first, the image is partially readjusted in accordance with an input from a user. Note that the hardware arrangement and the functional block arrangement of an image processing apparatus are the same as those in the above-described embodiments (FIGS. 1 and 2).

Figure 17:
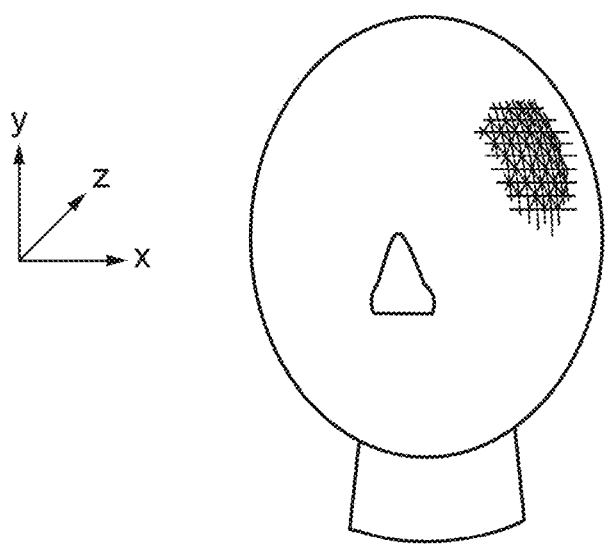
FIG. 17 is a view showing an example of a standard face model.

An image data obtainment unit 201 obtains input image data and 3D model data of a main subject. Here, for the input image data in which a face of a person has been captured, polygon model data (to be referred to as standard face model data hereinafter) that shows a standard schematic shape of a face is used as the 3D model data. FIG. 17 is a view showing an example of a standard face model. The obtained input image data and the standard face model data are transmitted to a parameter setting unit 202.

The parameter setting unit 202 determines adjustment parameters to be used in the initial adjustment based on the input image data. The parameter setting unit also displays a UI to make the settings related to each representative point on a display 110 and determines adjustment parameters to be used in readjustment based on a value instructed by a user on this UI and the standard face model data. Details of the processing will be described later. The determined adjustment parameters are transmitted to a color processing unit 203.

The color processing unit 203 adjusts the white balance of each type of image data by using the set adjustment parameters. Each type of image data includes input image data, image data that has undergone initial adjustment, and white-balance-adjusted image data. The adjusted image data is transmitted to a display 111 and displayed.

Figure 18:
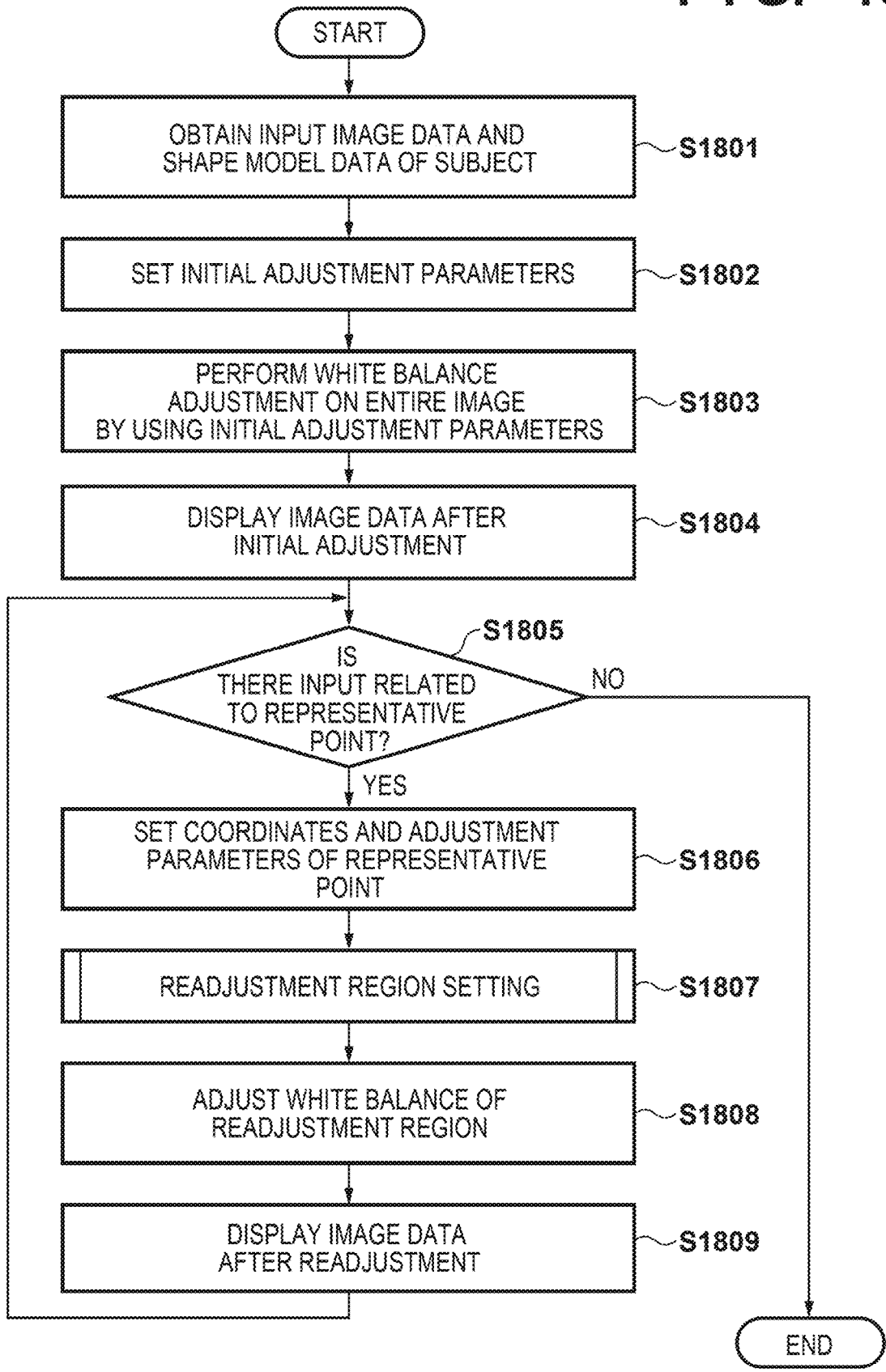
FIG. 18 is a flowchart of a series of processes according to the fifth embodiment.
Figure 19:
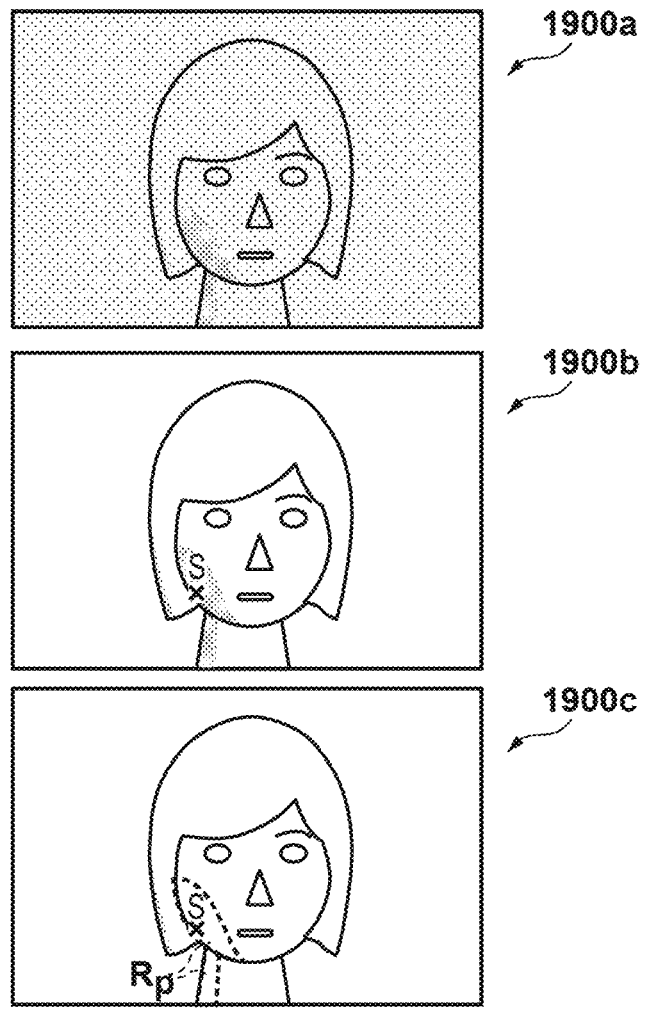
FIG. 19 is a view showing examples of input image data.

FIG. 18 is a flowchart of a series of processes according to the fifth embodiment.

In step S1801, the image data obtainment unit 201 obtains input image data from an HDD 104 or an image capturing apparatus. The standard face model data is also obtained from the HDD 104. A schematic view 1900a is a view showing an example of the input image data. In the example shown in this view, the white balance of the image is not suitable overall, and a portion of this person is strongly illuminated by light which has a color temperature different from the remaining portion.

In step S1802, the parameter setting unit 202 determines a set of gain coefficients $Gr_a$, $Gg_a$, and $Gb_a$ as the adjustment parameters used for initial adjustment. For example, a known automatic white balance technique can be used on the entire input image data.

In step S1803, the color processing unit 203 adjusts the white balance of the entire input image data by using the initial adjustment parameters set in step S1802. More specifically, the RGB values of all pixels in the input image data are multiplied by the gain coefficients $Gr_a$, $Gg_a$, and $Gb_a$, respectively. A schematic view 1900b is a view showing an example of an image obtained by performing initial adjustment on the input image of the schematic view 1900a. That is, the schematic view 1900b shows an example of a result obtained by determining adjustment parameters in accordance with a color temperature $L_a$ of light illuminating a large portion of the subject and uniformly adjusting the white balance of every pixel by using the adjustment parameters. In this example, since the color temperature that was assumed in the determination of the adjustment parameters do not match the color temperature of the light that actually illuminates the portion, a color cast has been generated in a portion strongly illuminated by light of a color temperature L different from the color temperature $L_a$.

In step S1804, the color processing unit 203 outputs image data that has undergone initial adjustment in step S1803 to the display 110 and displays the image data.

Figure 20:
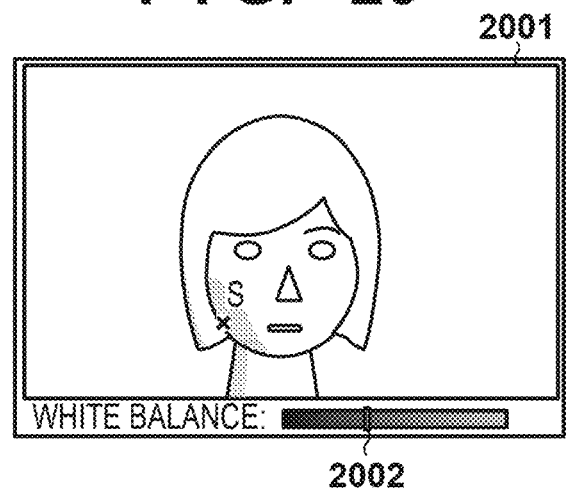
FIG. 20 is a view showing an example of a UI.

In step S1805, the parameter setting unit 202 outputs the UI to make the settings related to each representative point to the display 110 and displays the UI. If an input related to the settings of each representative point is made via the UI, the process advances to step S1806. If no input is made, the series of processes end. FIG. 20 is a view showing an example of the UI for making the settings related to each representative point in this embodiment. An image display region 2001 is a region displaying white-balance-adjusted image data. If the user wants to make further adjustments while referring to the displayed image data, he/she can make the settings related to each representative point via the UI.

In step S1806, the parameter setting unit 202 obtains each value instructed by the user on the UI displayed in step S1805, and sets the coordinates and the adjustment parameters of a representative point S. In the example of FIG. 20, a point within the image display region 2001 is clicked via a mouse to set coordinate values (i, j) corresponding to that point on the image as the coordinates of the representative point S. When a range slider 2002 is operated by the user, gain coefficients $Gr_p$, $Gg_p$, and $Gb_p$ corresponding to the position of the range slider are set as the adjustment parameters of the representative point. The relationship between the position of the range slider and the gain coefficients is set so that, for example, gain coefficients correspond to 2000 [K] when the range slider is at the left end and gain coefficients correspond to 12000 [K] when the range slider is at the right end, and the corresponding gain coefficients are determined by interpolation based on a distance ratio from both ends when the range slider is in middle position.

Figure 21:
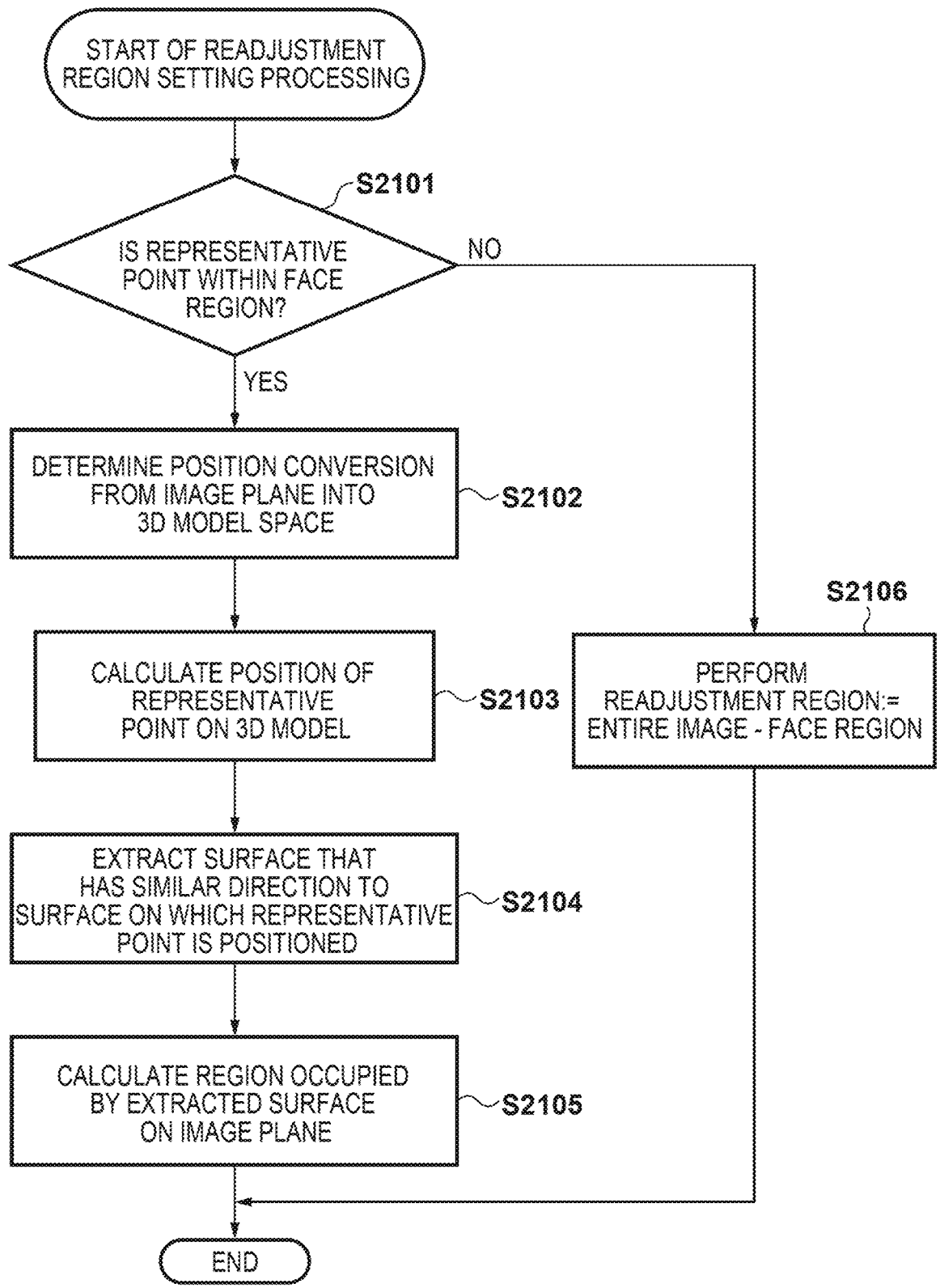
FIG. 21 is a detailed flowchart of readjustment region setting processing.

In step S1807, the parameter setting unit 202 determines (region determination) a readjustment region based on the coordinates of the representative point S set in step S1806. FIG. 21 is a detailed flowchart of readjustment region setting processing (step S1807).

In step S2101, the parameter setting unit 202 extracts a region (face region) where the subject's face has been captured on the input image by using a known face region extraction method to determine whether the representative point S set in step S1806 is included in this region. If the representative point S is included in the face region, the process advances to step S2102. Otherwise, the process advances to step S2106.

In step S2102, for pixels included in the face region extracted in step S2101, the parameter setting unit 202 obtains, based on the positions of facial organs, the size of the face region, and the like, a conversion that associates the positions on the input image plane to positions on polygons forming the standard face model. A known 3D-2D positioning technique can be used to perform the association.

In step S2103, the parameter setting unit 202 uses the conversion obtained in step S2102 to obtain a position $S_m$, on the standard face model, corresponding to the coordinates of the representative point S set in step S1806.

In step S2104, the parameter setting unit 202 extracts, from the polygons forming the standard face model, a polygon whose surface inclination is similar to that of the polygon of the position $S_m$ obtained in step S2103. Here, as the similarity between the inclinations of two polygons, an inner product of unit normal vectors of the respective polygons is used, and a polygon whose similarity with the polygon of the position $S_m$ is higher than a predetermined threshold is extracted.

In step S2105, the parameter setting unit 202 obtains a region occupied by the polygon extracted in step S2104 on the input image plane, and the region is set as the readjustment region. More specifically, the parameter setting unit 202 obtains pixel positions corresponding to the vertices of the polygon by using the inversion of the conversion obtained in step S2102 and sets a figure formed by connecting the pixel positions as a readjustment region $R_p$.

In step S2106, the parameter setting unit 202 sets, as the readjustment region $R_p$, a region obtained by excluding the face region extracted in step S2101 from the entire input image.

In step S1808, the color processing unit 203 adjusts the white balance of the readjustment region $R_p$ by using the adjustment parameters of the representative point S set in step S1806. More specifically, the RGB values of each pixel included in the readjustment region $R_p$ in the input image data are multiplied by the gain coefficients $Gr_p$, $Gg_p$, and $Gb_p$, respectively. Note that the similarity calculated at the time of the extraction of the polygon having a similar inclination in step S2104 may be stored so as to adjust each gain coefficient, which is a multiplier, to be closer to 1 (that is, to decrease the adjustment amount of the pixel value by the readjustment) when the similarity is low. A schematic view 1900c is a view showing an example of an image obtained by performing readjustment after setting the representative point S at the position of an x mark on an image after initial adjustment shown in the schematic view 1900b. In this example, the representative point S is set in a portion where a color cast has been generated in the schematic view 1900b. Also, based on the position of the representative point S, a region surrounded by a dotted line in the schematic view 1900c is set as the readjustment region $R_p$. By adjusting the white balance within the readjustment region $R_p$ by using the adjustment parameters of the representative point S, the color cast that has been generated after the initial adjustment can be reduced.

In step S1809, the color processing unit 203 outputs the image data that has undergone readjustment in step S1808 to the display 110 and displays the data. The process returns to step S1805.

Note that the face region extracted in step S2101 and the conversion obtained in step S2102 need not be obtained each time the readjustment region setting processing (step S1807) is to be repeated, and the extracted face region and the obtained conversion can be used again for second and subsequent operations.

As described above, according to the fifth embodiment, it is possible to perform, in relation to the main subject, white balance adjustment based on the inclination of the surface.

Sixth Embodiment

The sixth embodiment will describe an example in which a representative normal vector is set by a user via a UI. The sixth embodiment will also describe an example of a case in which the normal information cannot be obtained for a portion of an input image. Here, a normal map is used as the normal information. However, in a case in which the normal vector of a subject is unknown in a pixel (i, j), assume that a zero vector (0, 0, 0) is stored as a pixel value N(i, j) of the normal map. Note that the hardware arrangement and the functional block arrangement of an image processing apparatus are the same as those of the above-described embodiments (FIGS. 1 and 2).

A parameter setting unit 202 displays a UI for making the settings related to white balance adjustment on a display 110 via an output I/F 107. A value instructed by a user on the UI is obtained via an input I/F 106, and an adjustment parameter corresponding to a case in which a normal vector is unknown, a representative normal vector, and the adjustment parameter of the representative normal vector are set. Then, based on these settings, the adjustment parameter of each pixel in the input image is determined by using the normal map.

Figure 22A:
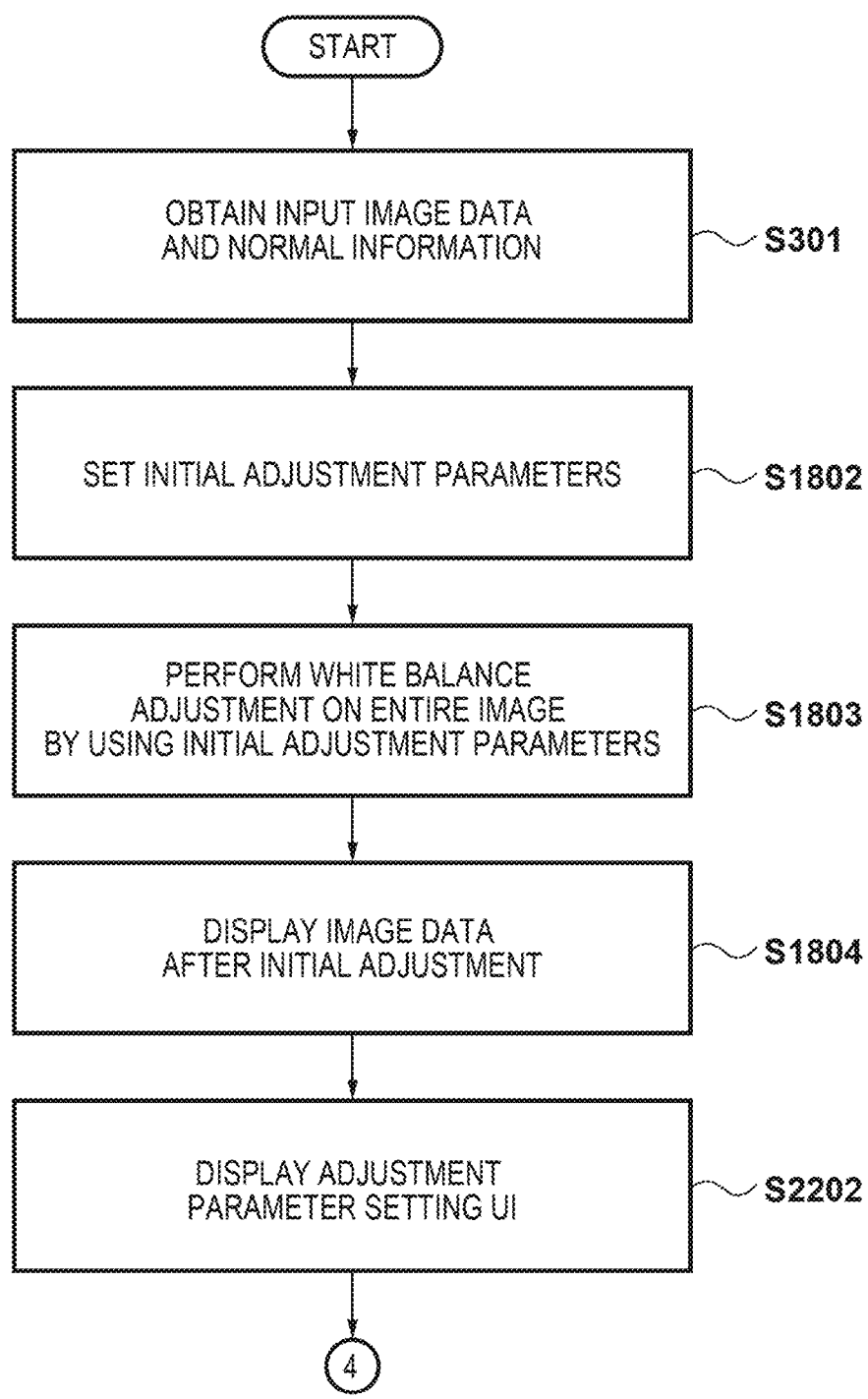
FIGS. 22A and 22B are flowcharts of a series of processes according to the sixth embodiment.
Figure 22B:
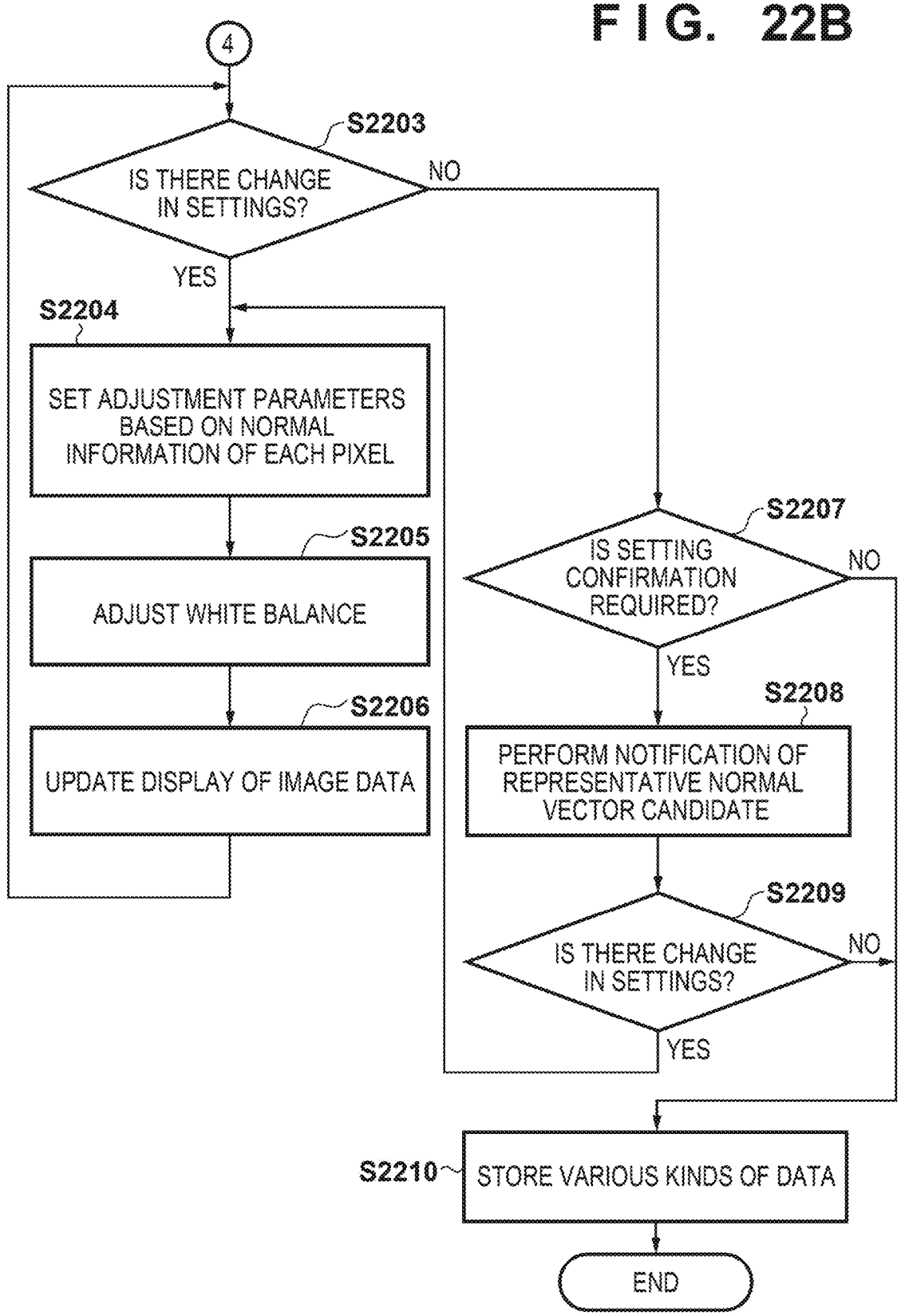
Figure 23:
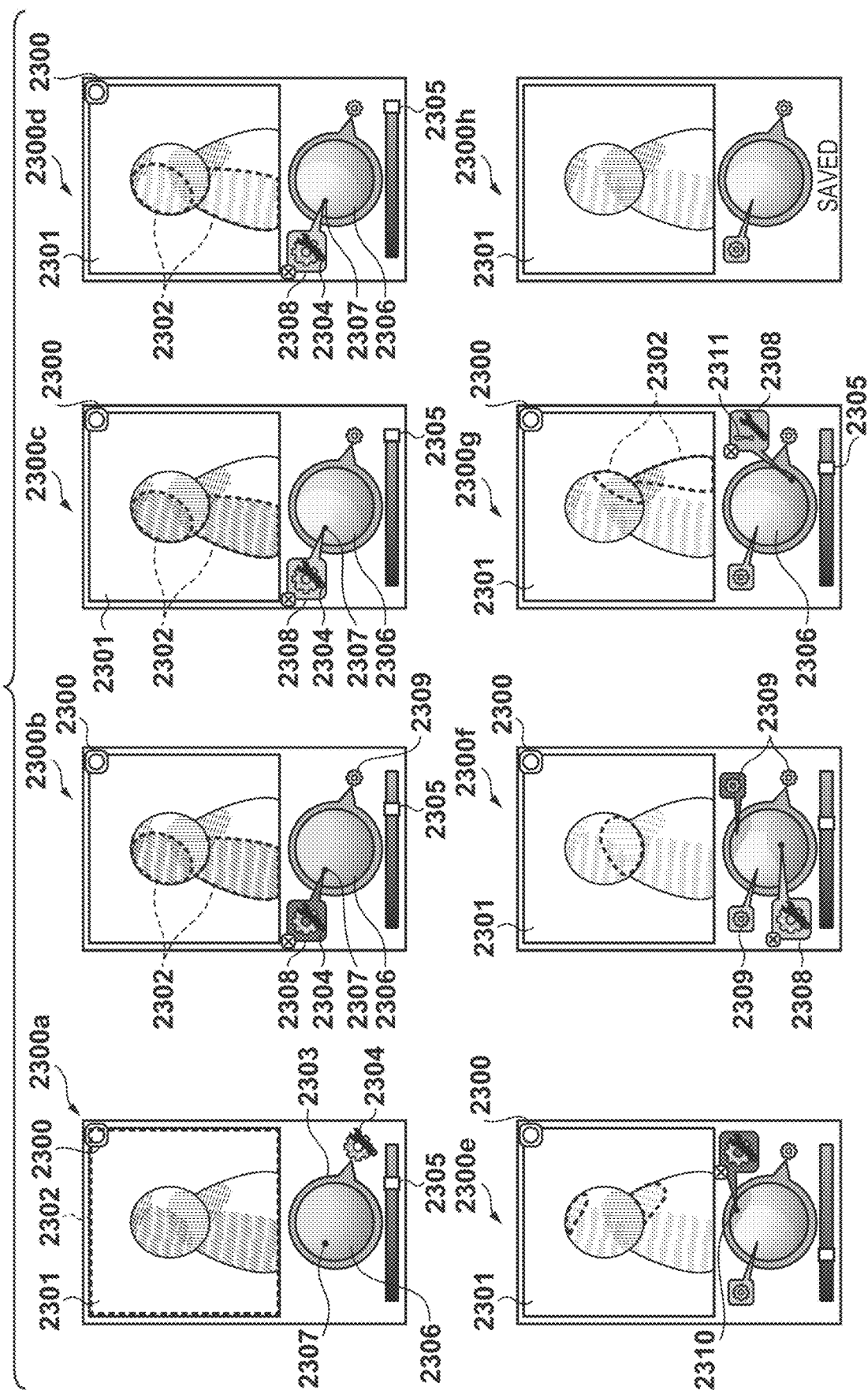
FIG. 23 is a view showing examples of a UI.

FIGS. 22A and 22B are flowcharts of a series of processes according to the sixth embodiment. Steps S301 and S1802 to S1804 are the same as those in the above-described embodiments, and a description thereof is omitted.

In step S2202, the parameter setting unit 202 sets a color temperature corresponding to the gain coefficients used in the initial adjustment as the color temperature (to be referred to as a base color temperature hereinafter) that is to be used in a case in which the normal vector is unknown. Also, a UI for making the settings related to white balance adjustment is output to the display 110 and displayed. A schematic view 2300a is a view showing an initial state of the UI according to this embodiment. An image display region 2301 displays the input image data after initial adjustment. A region that will be influenced if the color temperature setting is changed is highlighted by being surrounded by a dotted line 2302. The color of a base parameter display region 2303 represents the base color temperature. An icon 2304 represents that the base color temperature is selected as the target whose setting is to be changed by the operation of a range slider 2305. A spherical selector 2306 schematically represents the correspondence relationship of the direction of the normal vector and the color temperature to be used for adjustment. Each point on the spherical selector 2306 is associated with a normal vector of the sphere surface of the point, and the color of each point represents a color temperature used when adjusting the pixel holding the normal vector associated with the point. Here, since the same color temperature (=base color temperature) is used for the entire image in the initial adjustment, the entire spherical selector 2306 is rendered in a hue corresponding to the base color temperature. Note that, in the example of the input image in the schematic view 2300*a*, the subject is illuminated by light beams of different color temperatures from three directions other than the ambient light illuminating the entire scene. Hence, a different color cast is generated for each portion.

In step S2203, the parameter setting unit 202 obtains an input from the user via the UI displayed in step S2202. If an input related to setting change is made, the process advances to step S2204. Otherwise, the process advances to step S2207. A more specific example will be described hereinafter.

<Changing of Base Color Temperature>

When the range slider 2305 is operated by the user in the state of the schematic view 2300*a*, the base color temperature is changed to a color temperature corresponding to the position of the range slider, and the process advances to step S2204. At this time, the base parameter display region 2303 is rendered again in the color corresponding to the changed color temperature.

<Setting of New Representative Normal Vector>

When a point 2307 is designated on the spherical selector 2306 by the user in the state of the schematic view 2300*a*, the parameter setting unit 202 sets a normal vector corresponding to this point as a representative normal vector $N_{s1}$. Also, the same color temperature as the base color temperature is set as a color temperature $T_{s1}$ that corresponds to the representative normal vector $N_{s1}$. In addition, the similarity between the normal vector of each pixel and the representative normal vector $N_{s1}$ is calculated based on the normal map obtained in step S301, and a pixel region $R_{s1}$ that has a high degree of similarity is extracted. Subsequently, the UI is updated to the state of a schematic view 2300*b*.

In the schematic view 2300*b*, an endpoint of a representative display region 2308 indicates the point 2307 that has been designated by the user. The color of the representative display region 2308 represents the color temperature $T_{s1}$ associated with the representative normal vector $N_{s1}$. The icon 2304 represents that the color temperature $T_{s1}$ corresponding to the representative normal vector $N_{s1}$ is selected as a target whose setting is to be changed by the operation of the range slider 2305. An icon 2309 represents that the base color temperature is not selected as a target whose setting is to be changed. The dotted line 2302 highlights the region $R_{s1}$ that holds a normal vector similar to the representative normal vector $N_{s1}$. This region is a region that will be influenced if the color temperature $T_{s1}$ corresponding to the representative normal vector $N_{s1}$ is changed. When the range slider 2305 is operated by the user in this state, the color temperature $T_{s1}$ corresponding to the representative vector $N_{s1}$ is changed to a color temperature corresponding to the position of the range slider, and the process advances to step S2204. At this time, the UI changes to the state of a schematic view 2300*c*.

In the schematic view 2300*c*, the color of the representative parameter display region 2308 has changed to the color representing the changed color temperature $T_{s1}$. Additionally, on the spherical selector 2306, the hue of the periphery (that is, the region with a normal vector similar to the representative normal vector $N_{s1}$) of the point 2307 is changed to a hue corresponding to the changed color temperature $T_{s1}$.

<Completion of Setting>

When a user presses a setting completion button 2300 in the state of the schematic view 2300*a*, the process advances to step S2207.

In step S2204, the parameter setting unit 202 uses the normal map obtained in step S2201 and the representative normal vector and the color temperature that reflect the changes made in step S2203 to set the adjustment parameter for each pixel of the input image data. In this embodiment, gain coefficients $Gr_p$, $Gg_p$, and $Gb_p$ of a pixel $P(i_p, j_p)$ in the input image data is calculated by $$\begin{pmatrix} G_{rp} \\ G_{gp} \\ G_{bp} \end{pmatrix} = \qquad (12)$$

$$\begin{cases} \begin{pmatrix} G_{rB} \\ G_{gB} \\ G_{bB} \end{pmatrix} & \left( N_p = \begin{pmatrix} 0 \\ 0 \\ 0 \end{pmatrix} \right) \\ \dfrac{\alpha_{sMAX}}{\sum_{k=1}^{K} \alpha_{sk}} \sum_{k=1}^{K} \left\{ \alpha_{sk} \begin{pmatrix} G_{rk} \\ G_{gk} \\ G_{bk} \end{pmatrix} \right\} + (1 - \alpha_{sMAX}) \begin{pmatrix} G_{rB} \\ G_{gB} \\ G_{bB} \end{pmatrix} & \left( N_p \neq \begin{pmatrix} 0 \\ 0 \\ 0 \end{pmatrix} \right) \end{cases}$$

$$\alpha_{sk} = \begin{cases} \dfrac{N_{sk} \cdot N_p - Th\alpha}{1 - Th\alpha} & (N_{sk} \cdot N_p > Th\alpha) \\ 0 & (N_{sk} \cdot N_p \leq Th\alpha) \end{cases} \qquad (13)$$

where $Gr_b$, $Gg_b$, and $Gb_b$ are gain coefficients corresponding to the base color temperature. $Gr_k$, $Gg_k$, and $Gb_k$ are gain coefficients for a color temperature $T_{sk}$ associated with a representative normal vector $N_{sk}$. $\alpha_{sk}$ is the similarity between the representative normal vector $N_{sk}$ and a normal vector $N_p$ of a pixel P. $Th\alpha$ is a threshold related to a predetermined similarity. The similarity $\alpha_{sk}$ (=0 to 1) changes to a maximum value when the representative normal vector $N_{sk}$ and the normal vector $N_p$ of the pixel P match each other, and changes to zero when an angle formed by $N_{sk}$ and $N_p$ is equal to or larger than a predetermined value ($\cos^{-1}(Th\alpha)$). $\alpha_{sMAX}$ is the maximum value of the similarity $\alpha_{sk}$ (k=1 to K). In equation (12), in a case in which the normal vector $N_p$ of the pixel P is unknown, the gain coefficients for the pixel P will have the same values as the gain coefficients corresponding to the base color temperature. In other cases, the values are determined by interpolation based on the similarity of the normal vector.

In step S2205, a color processing unit 203 adjusts the white balance of the input image data. More specifically, the pixel values of the input image data are multiplied by the gain coefficients $Gr_p$, $Gg_p$, and $Gb_p$ for each pixel set in step S2204.

In step S2206, the color processing unit 203 outputs the image data that has been adjusted in step S2205 to the display 110 to update the display of the image display region 2301. At this time, the UI changes to the state of a schematic view 2300*d*. In the schematic view 2300*d*, the image data that has been adjusted in step S2205 is displayed in the image display region 2301, and the color of the region surrounded by the dotted line 2302 has been changed by the adjustment. (The color cast generated in the region $R_{s1}$ is reduced by the adjustment using the color temperature $T_{s1}$ corresponding to the representative normal vector $N_{s1}$.)

When the image data display is updated in step S2206, the process returns to step S2203, and the parameter setting unit 202 obtains an input from the user again. If the user wants to make further adjustments while referring to the updated image data, he/she can make changes to the setting or add a representative normal vector via the UI. A schematic view 2300e is an example in which a point 2310 and a color temperature corresponding to this point have been input from the state of the schematic view 2300d and the processes of steps S2204 to S2206 have been performed accordingly, and the color cast of the portion surrounded by the dotted line has been reduced. Also, a schematic view 2300f is an example of a case in which a representative normal vector has been further added from the state of the schematic view 2300e. Note that it may be set so that the base color temperature that has been set once or the color temperature of the representative normal vector will become a change target again by pressing the icon 2309. In addition, by pressing an x button belonging to the representative display region 2308, settings related to a representative normal vector corresponding to the region may be deleted.

In step S2207, the parameter setting unit 202 determines, based on the normal map obtained in step S301 and the representative normal vector that is currently set, whether setting confirmation related to white balance adjustment is required. In this embodiment, in a case in which the direction of the subject surface for a given pixel is not similar to the direction of any of representative normal vectors, an adjustment parameter that is the same as that of a pixel whose normal information is unknown is used for the given pixel. However, a more preferable adjustment result may be obtained by adjusting the white balance by adding a representative normal vector for such a pixel. Hence, for each pixel in the input image data in which $N(i, j) \neq (0, 0, 0)$, the similarity $\alpha_{sk}$ of the normal vector is calculated and the maximum value $\alpha_{sMAX}$ of the similarity is obtained for each pixel by equation (13).

Subsequently, in a case in which the number of pixels in which $\alpha_{sMAX}=0$ with respect to the number of pixels of the entire image is equal to or more than a predetermined ratio, it is determined that setting confirmation is required. If it is determined that confirmation is required, the process advances to step S2208. Otherwise, the process advances to step S2210.

In step S2208, the parameter setting unit 202 notifies the user of a representative normal vector candidate suitable for adjustment. More specifically, the parameter setting unit calculates a median value of the normal vectors related to the pixel in which $\alpha_{sMAX}=0$ which has been obtained in step S2207, and the obtained median value is displayed as the representative normal vector candidate on the UI. A schematic view 2300g shows an example in which the setting completion button 2300 is pressed in state of the schematic view 2300d in step S2203. In the schematic view 2300g, the endpoint of the representative display region 2308 indicates a point corresponding to the representative normal vector candidate on the spherical selector 2306. An icon 2311 represents that the normal vector indicated by the representative display region 2308 is a representative normal vector candidate. The dotted line 2302 highlights a region that holds a normal vector that is similar to the representative normal vector candidate. This region is a region that will be influenced when the representative normal candidate is set as the representative normal vector and its corresponding color temperature is changed.

In step S2209, the parameter setting unit 202 obtains an input from the user via the UI in the same manner as in step S2203. If an input related to setting change is made, the process returns to step S2204. Otherwise, the process advances to step S2210. A more specific example will be described hereinafter.

<Addition of Representative Normal Vector>

When the range slider 2305 is operated by the user in the state of the schematic view 2300g, the representative normal vector candidate (that is, the normal vector indicated by the representative display region 2308 with the icon 2311) is added to the representative normal vector. In addition, a color temperature corresponding to the position of the range slider is set as the color temperature corresponding to this representative normal vector, and the process returns to step S2204.

<Rejection of Candidate>

When the setting completion button 2300 is pressed in the state of the schematic view 2300g, the representative normal vector candidate is not added to the representative normal vector, and the process advances to step S2210.

In step S2210, the color processing unit 203 stores the white-balance adjusted image data in a storage device such as an HDD 104 or the like. Subsequently, the UI is updated to the state of a schematic view 2300h to notify the user that the storage has been completed.

According to the sixth embodiment described above, the user can set a representative normal vector by intuitive operation via the UI.

Note that in step S2210, the base color temperature used for adjustment, the representative normal vector, and the color temperature corresponding to the representative normal vector may be separately stored as pieces of adjustment parameter information. In this case, if the stored pieces of adjustment parameter information are obtained together with the input image data and the normal information in step S301, an adjustment operation that has been performed once can be easily applied to a different set of input image data.

Seventh Embodiment

The seventh embodiment will describe an example in which normal information is calculated based on an image in which a subject has been captured from a plurality of different viewpoint positions, and this normal information is used to perform white balance adjustment. Note that the hardware arrangement and the functional block arrangement of an image processing apparatus are the same as those of the above-described embodiments (FIGS. 1 and 2).

An image data obtainment unit 201 obtains input image data and sub-input image data (auxiliary input image) in which the subject in the input image data has been captured from a different viewpoint position. The camera parameters (information representing the position and orientation of the camera and the distortion of the lens) when these sets of image data were captured are obtained. These sets of image data and camera parameters will be referred to as multi-viewpoint image data hereinafter. In this embodiment, of the two images obtained by performing image capturing by a stereo camera, one set of image data is used as the input image data and the other set is used as the sub-input image data.

A parameter setting unit 202 calculates a representative normal vector by using the multi-viewpoint image data. Details of the processing will be described later.

Figure 24:
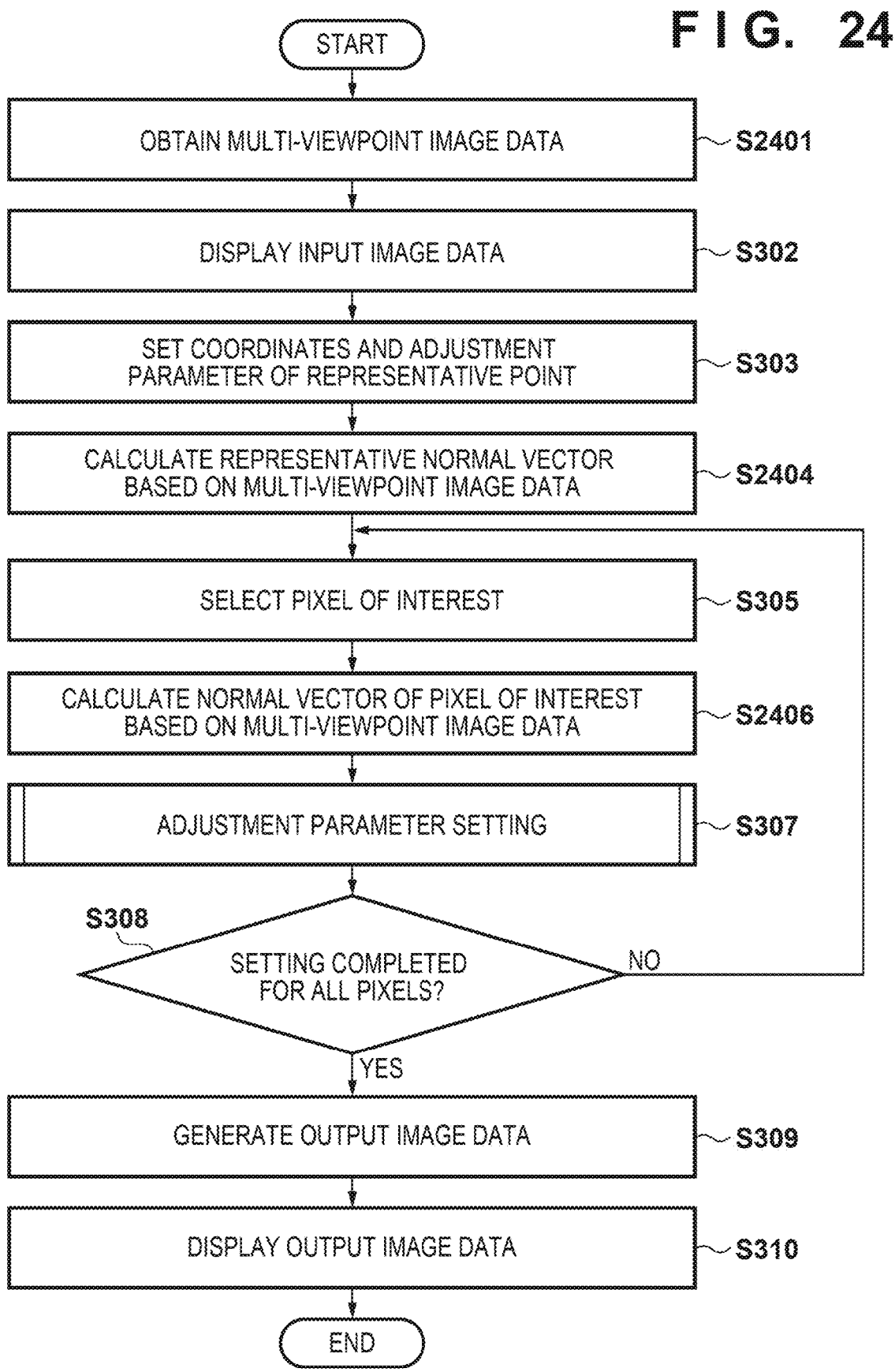
FIG. 24 is a flowchart of a series of processes according to the seventh embodiment.

FIG. 24 is a flowchart of a series of processes according to the seventh embodiment. Steps S302, S303, S305, and S307 to S310 are the same as those in the first embodiment, and a description thereof will be omitted.

In step S2401, the image data obtainment unit 201 obtains the multi-viewpoint image data from an HDD 104 or an image capturing apparatus.

In step S2404, the parameter setting unit 202 calculates a representative normal vector by using the multi-viewpoint image data obtained in step S2401 to obtain the direction of the surface including the representative point set in step S303. First, feature points are extracted from each of the input image data and the sub-input image data, and the feature points are associated between the images. A known feature base matching technique can be used for this process. Next, from the associated feature points, three points that form a minimum triangle which includes a representative point are selected on the input image. Next, for each of the selected three feature points, three-dimensional coordinates are estimated based on the position on each image and the camera parameters. Subsequently, the unit normal vector of the surface of a triangle formed by the three points is calculated by using the obtained three-dimensional coordinates, and the calculated vector is set as the representative normal vector.

In step S2406, the parameter setting unit 202 uses the multi-viewpoint image data obtained in step S2401 to calculate the normal vector corresponding to the pixel of interest selected in step S305. More specifically, processing is executed in the same manner as that in step S2404 by replacing the representative point with a pixel of interest. Note that feature point association need not be performed again, and the result obtained in step S2404 can be used. In addition, the results that have been already calculated can be used when the same feature points are to be used for the estimation of three-dimensional coordinates and the calculation of a unit normal vector.

As described above, according to the seventh embodiment, the normal information can be calculated from multi-viewpoint image data, and white balance adjustment can be performed based on the calculated normal information.

Note that the sub-input image data may be an image captured by a camera other than the camera that captured the input image data, and may be two or more images. Furthermore, the subject may be captured using a plenoptic camera in which a microlens array is arranged between a main lens and an image capturing element, and of the plurality of sets of image data that are obtained, one set of image data may be used as the input image data and the remaining sets of image data may be used as the sub-input image data.

Eighth Embodiment

The eighth embodiment will describe an example in which white balance adjustment is performed by using normal information calculated based on distance information. Note that the hardware arrangement and the functional block arrangement of an image processing apparatus are the same as those of the above-described embodiments (FIGS. 1 and 2).

An image data obtainment unit 201 obtains input image data and the angle of view and the focal length of an image capturing apparatus used when the input image data was captured. The distance information of a subject is also obtained. Here, a distance map is used as the distance information.

A parameter setting unit 202 calculates each type of normal vector based on the distance map. Details of the processing will be described later.

Figure 25:
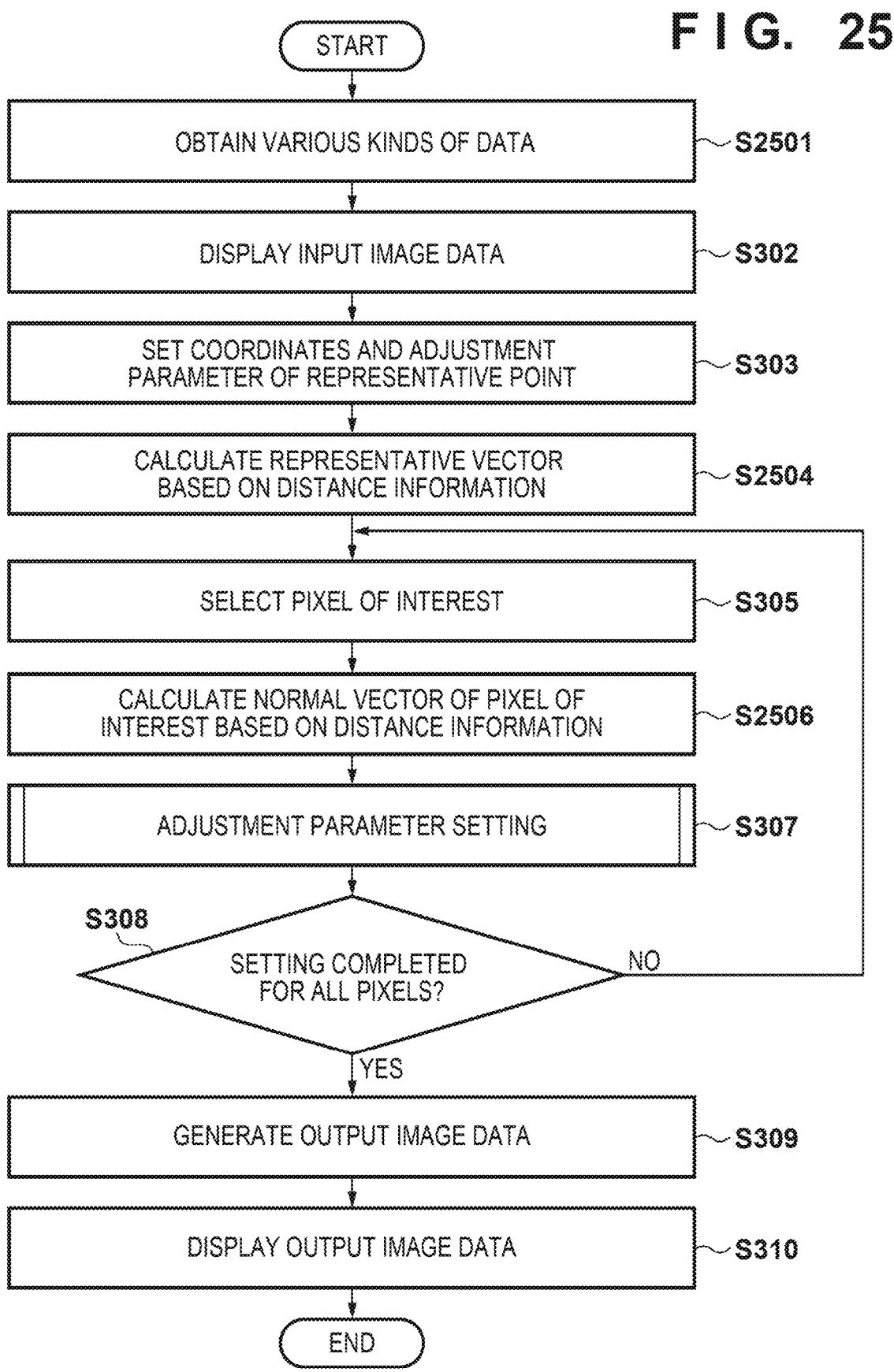
FIG. 25 is a flowchart of a series of processes according to the eighth embodiment.

FIG. 25 is a flowchart of a series of processes according to the eighth embodiment. Steps S302, S303, S305, and S307 to S310 are the same as those in the first embodiment, and a description thereof will be omitted.

In step S2501, the image data obtainment unit 201 obtains, from an HDD 104 or an image capturing apparatus, the input image data, the angle of view and the focal length used at the time of the image capturing operation, and a distance map.

In step S2504, the parameter setting unit 202 calculates, based on a distance map obtained in step S2501, a representative normal vector by obtaining the direction of a surface that includes the representative point set in step S303. First, the three-dimensional coordinates of a point on the subject surface corresponding to each pixel of the input image are calculated by using the angle of view and the focal length at the time of the image capturing operation, and the distance map.

Next, the input image is segmented into a plurality of regions, and a plane is fitted in each region with respect to the three-dimensional point group data corresponding to the pixel. The segmentation of the input image may be performed by block segmentation in accordance with a predetermined segmentation count or by segmentation using a general region segmentation method based on pixel values. In the planar fitting, for example, a plane in which the total sum of squared distances between the set of points corresponding to the pixels included in the region is a minimum value may be obtained. The unit normal vector of the plane fitted to the region including the representative point will be set as the representative normal vector.

In step S2506, the parameter setting unit 202 calculates the normal vector corresponding to a pixel of interest by performing the same processing as in step S2504 by replacing the representative point selected in step S305 with the pixel of interest. Note that the planar fitting need not be performed again, and it is possible to use the result obtained in step S2504.

According to the eighth embodiment described above, white balance adjustment can be performed by calculating the normal information from the distance map.

Note that although a surface forming the subject is obtained by fitting a plane to the three-dimensional point group data calculated based on the distance map in this embodiment, the subject surface may be obtained by using another shape model generation technique that generates a three-dimensional shape from a distance map.

In addition, a normal map may be generated from a distance map, and the first to fourth and sixth embodiments may be applied. Although various kinds of methods are known in general as the methods of generating a normal map from the distance map, they are irrelevant to the present invention, and a detailed description will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081436, filed Apr. 17, 2017 and No. 2018-005949, filed Jan. 17, 2018, which are hereby incorporated by reference herein in their entirety.

What is claimed is:

1. An image processing apparatus comprising:
a memory configured to store instructions; and
processing circuitry configured to execute the instructions stored in the memory to cause the image processing apparatus to implement:
a first obtainment unit configured to obtain an input image;
a determination unit configured to determine a representative point in the input image and a white balance coefficient of the representative point;
a second obtainment unit configured to obtain first information representing the inclination of a surface that includes the representative point and second information representing the inclination of a surface that includes a pixel of interest in the input image; and
an adjustment unit configured to adjust white balance of the pixel of interest based on the first information, the second information, and the white balance coefficient.

2. The apparatus according to claim 1, wherein the first information is normal information of a subject with respect to a representative point, and
the second information is normal information of a subject with respect to the pixel of interest.

3. The apparatus according to claim 1, wherein the determination unit comprises a reception unit configured to receive information for determining the representative point from a user.

4. The apparatus according to claim 3, wherein the reception unit receives designation of a normal vector from the user, and
the determination unit determines, among pixels included in the input image, a pixel corresponding to the normal vector as the representative point.

5. The apparatus according to claim 1, wherein the first obtainment unit further obtains normal information of each pixel included in the input image,
the processing circuitry is configured to execute the instructions stored in the memory to cause the image processing apparatus to further implement a segmentation unit configured to perform region segmentation of the input image based on the normal information of each pixel included in the input image, and
the adjustment unit adjusts the white balance for each region segmented by the segmentation unit.

6. The apparatus according to claim 1, wherein the first obtainment unit further obtains normal information related to a subject with respect to each pixel included in the input image, and
the adjustment unit calculates, based on the normal information, a similarity between a normal of the representative point and a normal of each pixel included in the input image, and derives the white balance of each pixel included in the input image by interpolation calculation based on the white balance coefficient using the similarity as a weighting coefficient.

7. The apparatus according to claim 6, wherein the determination unit determines a plurality of representative points in the input image and white balance coefficients corresponding to the plurality of representative points,
the first obtainment unit further obtains feature amount information other than the normal information related to the subject with respect to each pixel included in the input image, and
in a case in which there are a plurality of representative points that have approximately matching normals and different white balance coefficients, the adjustment unit adjusts the white balance of each pixel included in the input image by multiplying the white balance coefficients by a weighting coefficient based on the normal information and the feature amount information.

8. The apparatus according to claim 7, wherein the adjustment unit calculates, based on the normal information, a first similarity between a normal of the representative point and the normal of each pixel included in the input image, calculates, based on the feature amount information, a second similarity between a feature amount of the representative point and a feature amount of each pixel included in the input image, and adjusts the white balance of each pixel included in the input image by multiplying the white balance coefficient by a weighting coefficient based on the first similarity and the second similarity.

9. The apparatus according to claim 1, wherein the first obtainment unit further obtains an auxiliary input image that captures a subject included in the input image from a viewpoint different from that of the input image, and
the second obtainment unit determines the first information and the second information based on the input image and the auxiliary input image.

10. The apparatus according to claim 1, wherein the first obtainment unit further obtains distance information of a subject with respect to each pixel included in the input image, and
the second obtainment unit determines the first information and the second information based on the distance information.

11. The apparatus according to claim 1, wherein the first obtainment unit further obtains a 3D model of a subject included in the input image,
the processing circuitry is configured to execute the instructions stored in the memory to cause the image processing apparatus to further implement a region determination unit configured to determine an adjustment region to adjust the white balance in the input image, and the region determination unit determines, as the adjustment region, a region of a pixel determined to have a normal that approximately matches the normal of the representative point based on the 3D model.

12. The apparatus according to claim 6, wherein the determination unit determines K representative points, the adjustment unit converts a normal vector of each representative point and a normal vector of a pixel of interest into sets of polar coordinates, and calculates the similarity, in a line connecting two representative points among the representative points in the sets of polar coordinates, based on the position of a point, on the line, indicating the foot of perpendicular line drawn from a point of the normal vector of a pixel of interest.

13. The apparatus according to claim 2, wherein the adjustment unit adjusts the white balance so that a corresponding color temperature will be reflected strongly on an interpolation result for a representative point of a normal vector more similar to the direction of a normal vector of the pixel of interest.

14. The apparatus according to claim 1, wherein the first obtainment unit further obtains distance information of a subject with respect to each pixel included in the input image, and the adjustment unit adjusts the white balance of the pixel of interest based on the distance information.

15. The apparatus according to claim 14, wherein the adjustment unit selects, from a plurality of representative points, a representative point to be used for white balance adjustment of the pixel of interest based on the distance information.

16. The apparatus according to claim 1, wherein the adjustment unit adjusts the white balance of the pixel of interest in accordance with a region including the pixel of interest by determining, for a region formed from a plurality of pixels in the input image, a parameter for adjusting the white balance based on the representative point.

17. The apparatus according to claim 3, wherein the reception unit causes a display unit to display a display image for designating a representative point in the input image.

18. A control method of an image processing apparatus, the method comprising:

obtaining an input image;

determining a representative point in the input image and a white balance coefficient of the representative point;

obtaining first information representing the inclination of a surface that includes the representative point and second information representing the inclination of a surface that includes a pixel of interest in the input image; and adjusting white balance of the pixel of interest based on the first information, the second information, and the white balance coefficient.

19. The method according to claim 18, wherein the first information is normal information of a subject with respect to a representative point, and the second information is normal information of a subject with respect to the pixel of interest.

20. A non-transitory computer-readable recording medium storing a program that causes a computer to function as an image processing apparatus comprising:

a first obtainment unit configured to obtain an input image;

a determination unit configured to determine a representative point in the input image and a white balance coefficient of the representative point;

a second obtainment unit configured to obtain first information representing the inclination of a surface that includes the representative point and second information representing the inclination of a surface that includes a pixel of interest in the input image; and an adjustment unit configured to adjust white balance of the pixel of interest based on the first information, the second information, and the white balance coefficient, wherein the first obtainment unit, the determination unit, the second obtainment unit, and the adjustment unit are implemented by the computer executing the program.

* * * * *